US012789383B2

(12) United States Patent
Tsutsui et al.

(10) Patent No.: US 12,789,383 B2
(45) Date of Patent: Nov. 10, 2026

(54) POSITION SETTING DEVICE FOR SETTING WORKPIECE STACKING POSITION AND ROBOT APPARATUS PROVIDED WITH POSITION SETTING DEVICE

(71) Applicant: Fanuc Corporation, Minamitsuru-gun (JP)

(72) Inventors: Shinichirou Tsutsui, Minamitsuru-gun (JP); Tadanori Suzuki, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 262 days.

(21) Appl. No.: 17/919,806

(22) PCT Filed: Apr. 16, 2021

(86) PCT No.: PCT/JP2021/015774
§ 371 (c)(1),
(2) Date: Oct. 19, 2022

(87) PCT Pub. No.: WO2021/215370
PCT Pub. Date: Oct. 28, 2021

(65) Prior Publication Data

US 2023/0158677 A1 May 25, 2023

(30) Foreign Application Priority Data

Apr. 21, 2020 (JP) ................................ 2020-075545

(51) Int. Cl.
*B25J 9/16* (2006.01)
*B25J 13/08* (2006.01)
(Continued)

(52) U.S. Cl.
CPC ............ *B25J 9/1687* (2013.01); *B25J 13/08* (2013.01); *B65G 57/03* (2013.01); *G05B 19/4155* (2013.01); *G05B 2219/50391* (2013.01)

(58) Field of Classification Search
CPC ........ B25J 9/1687; B25J 13/08; B25J 19/023; B25J 9/1697; B25J 9/00; B25J 9/16;
(Continued)

(56) References Cited

U.S. PATENT DOCUMENTS 5,908,283 A * 6/1999 Huang ................ G06Q 10/043 414/21
10,696,494 B1 6/2020 Diankov et al.
(Continued)

FOREIGN PATENT DOCUMENTS

CN 109264412 A 1/2019
DE 10 2007 001 263 A1 7/2008
(Continued)

OTHER PUBLICATIONS

International Search Report and Written Opinion for International Application No. PCT/JP2021/015774, dated Jun. 29, 2021, 7 pages.

*Primary Examiner* — Adam R Mott
*Assistant Examiner* — Byron Xavier Kasper
(74) *Attorney, Agent, or Firm* — BUCHANAN INGERSOLL & ROONEY PC

(57) ABSTRACT

Provided is a position setting device that sets a position for stacking a second workpiece on a plurality of first workpieces. This position setting device is provided with a search unit that searches for a position where the second workpiece is allowed to be disposed on the first workpieces. The search unit includes a determination unit that determines whether to allow the second workpiece to be disposed so as to be supported on one of the first workpieces and another one of
(Continued)

the first workpieces when the upper surface of the one first workpiece and the upper surface of the other first workpiece are different from each other in height. The determination unit allows the second workpiece to be disposed so as to be supported on both of the one first workpiece and the other first workpiece when the height difference is within a determination range.

5 Claims, 29 Drawing Sheets

(51) Int. Cl.

| | |
|---|---|
| ***B25J 19/02*** | (2006.01) |
| ***B65G 57/03*** | (2006.01) |
| ***B65G 61/00*** | (2006.01) |
| ***G05B 19/4155*** | (2006.01) |

(58) Field of Classification Search

CPC ........ B25J 9/0096; B25J 9/161; B25J 9/1669; B65G 57/03; B65G 61/00; B65G 1/00; B65G 57/00; B65G 57/02; B65G 60/00; G05B 19/4155; G05B 2219/50391; G05B 2219/40006

See application file for complete search history.

(56) References Cited

U.S. PATENT DOCUMENTS

| | | | | |
|---|---|---|---|---|
| 10,953,549 | B2 * | 3/2021 | Diankov | ................ B25J 9/1676 |
| 2010/0324729 | A1 | 12/2010 | Ruge | |
| 2016/0167232 | A1 * | 6/2016 | Takeshita | ............... G06V 20/20 901/14 |
| 2017/0146341 | A1 | 5/2017 | Kimoto et al. | |
| 2017/0267467 | A1 * | 9/2017 | Kimoto | ............ G05B 19/41865 |
| 2020/0031593 | A1 * | 1/2020 | Usami | .................... B25J 9/0093 |

FOREIGN PATENT DOCUMENTS

| | | | |
|---|---|---|---|
| DE | 10 2019 130 639 | A1 | 12/2020 |
| EP | 2 444 210 | A1 | 4/2012 |
| JP | 62251811 | A | 11/1987 |
| JP | 06171756 | A | 6/1994 |
| JP | 07291451 | A | 11/1995 |
| JP | 11059909 | A | 3/1999 |
| JP | H11-300683 | A | 11/1999 |
| JP | 2000296916 | A | 10/2000 |
| JP | 2004-307111 | A | 11/2004 |
| JP | 3969334 | B2 | 9/2007 |
| JP | 2013-129034 | A | 7/2013 |
| JP | 6267175 | B2 | 1/2018 |
| JP | 2019181620 | A * | 10/2019 |
| WO | 2017061632 | A1 | 4/2017 |
| WO | 2017149616 | A1 | 9/2017 |

* cited by examiner

POSITION SETTING DEVICE FOR SETTING WORKPIECE STACKING POSITION AND ROBOT APPARATUS PROVIDED WITH POSITION SETTING DEVICE

CROSS REFERENCE TO RELATED APPLICATIONS

This is the U.S. National Phase application of PCT/JP2021/015774, filed Apr. 16, 2021, which claims priority to Japanese Patent Application No. 2020-075545, filed Apr. 21, 2020, the disclosures of these applications being incorporated herein by reference in their entireties for all purposes.

FIELD OF THE INVENTION

The present invention relates to a position setting device for setting a workpiece stacking position, and a robot apparatus provided with the position setting device.

BACKGROUND OF THE INVENTION

When an article is conveyed to a destination, the article may be conveyed by a container, a pallet, or the like. In this case, an operation of arranging a plurality of articles in a predetermined region inside the container or a predetermined region on an upper side of the pallet is performed.

In the related art, an operation of arranging an article in a predetermined region is known to be performed by a robot apparatus (e.g., Japanese Unexamined Patent Publication No. 2019-181620A and International Publication No. WO2017/149616A1). Further, a robot apparatus that stacks an article in a plurality of stages when the article is conveyed is known (e.g., Japanese Unexamined Patent Publication No. 7-291451A and Japanese Unexamined Patent Publication No. 11-59909A). Further, control of stacking a plurality of types of articles having sizes different from each other when a robot apparatus stacks an article is known (e.g., International Publication No. WO 2017/061632A1).

Furthermore, when a plurality of types of articles are stacked, an order in which the articles are stacked may not be determined. In this case, it is known that a robot apparatus detects dimensions of a workpiece and performs control of arranging an article according to the dimensions of the workpiece (e.g., Japanese Unexamined Patent Publication No. 62-251811A and Japanese Patent No. 6267175B).

PATENT LITERATURE

[PTL 1] Japanese Unexamined Patent Publication No. 2019-181620A
[PTL 2]: International Publication No. WO 2017/149616A1
[PTL 3] Japanese Unexamined Patent Publication No. 7-291451A
[PTL 4] Japanese Unexamined Patent Publication No. 11-59909A
[PTL 5] International Publication No. WO2017/061632A1
[PTL 6] Japanese Unexamined Patent Publication No. 62-251811A
[PTL 7] Japanese Patent No. 6267175B

SUMMARY OF THE INVENTION

An operation of arranging an article in a predetermined region of a container or the like is referred to as a picking operation. When a plurality of types of articles are arranged in a container or the like, a size of the plurality of types of articles and an order in which the articles are stacked may be predetermined. In this case, a pattern for stacking the articles can be generated in advance, and the article can be arranged based on the pattern for stacking the articles.

On the other hand, the number of an article arranged in a container or the like that conveys the article, a size of the article, and an order in which the article is stacked may not be determined. For example, a type of an article and the number of the article may be different for each order of a customer to which the article is delivered. Such an operation of arranging a plurality of types of articles in a container or the like for each order is referred to as order picking. In this case, control of setting a position where a robot apparatus stacks an article is difficult. In many cases, an operator stacks an article manually.

In particular, when an article is arranged on an upper side of an article that has been arranged in a container or the like, a collapse of the article may occur. When an article is arranged, a position of the article needs to be determined such that a collapse does not occur. Additionally, many articles are preferably arranged in a container or the like. However, when a size of an article, the number of the article, an order in which the article is supplied are not determined, there is a problem that it is difficult to determine a position where the article is efficiently arranged. Further, there is a problem that it is difficult to determine a position where the article is stacked such that a collapse does not occur.

A first aspect of the present disclosure is a position setting device configured to set a position where a second workpiece is stacked on an upper side of a plurality of first workpieces. The position setting device includes a sensor configured to detect a shape of the second workpiece. The position setting device includes a shape detection unit configured to detect a shape of the second workpiece based on an output from the sensor, and an acquisition unit configured to acquire shapes and positions of the plurality of first workpieces. The position setting device includes a search unit configured to search for a position where the second workpiece is allowed to be arranged on the upper side of the plurality of first workpieces. Each workpiece of the first workpiece and the second workpiece includes a top face and a bottom face. A determination range of a difference in height between a top face of one first workpiece and a top face of another first workpiece is predetermined. The search unit includes a determination unit configured to determine whether the second workpiece is allowed to be arranged so as to be supported by both workpieces of the one first workpiece and the other first workpiece when a height of the top face of the one first workpiece and a height of the top face of the other first workpiece are different. The determination unit allows the second workpiece to be arranged so as to be supported by both workpieces of the one first workpiece and the other first workpiece when a difference in the height falls within the determination range. The determination unit prohibits the second workpiece from being arranged so as to be supported by both workpieces of the one first workpiece and the other first workpiece when a difference in the height deviates from the determination range.

A second aspect of the present disclosure is a robot apparatus including the above-described position setting device. The robot apparatus includes an operation tool configured to grip the second workpiece, a robot configured to move the operation tool, and a controller configured to control the operation tool and the robot. The controller detects a position and an orientation of the second workpiece based on an output from the sensor. The controller drives the robot so as to grip the second workpiece based on the position and the orientation of the second workpiece. The controller drives the robot so as to convey the second workpiece to a position, set by the position setting device, where the second workpiece is arranged.

According to an aspect of the present disclosure, a position setting device that sets a position where a second workpiece is stacked on an upper side of a plurality of first workpieces can be provided.

DETAILED DESCRIPTION OF EMBODIMENTS OF THE INVENTION

A position setting device and a robot apparatus provided with the position setting device in an embodiment will be described with reference to FIG. 1 to FIG. 29. The position setting device of the present embodiment sets a position where a workpiece is arranged with respect to a container. In particular, the position setting device sets a position where a second workpiece is stacked on an upper side of a plurality of first workpieces arranged in a container. The robot apparatus conveys a workpiece to a position set by the position setting device in a container.

Figure 1:
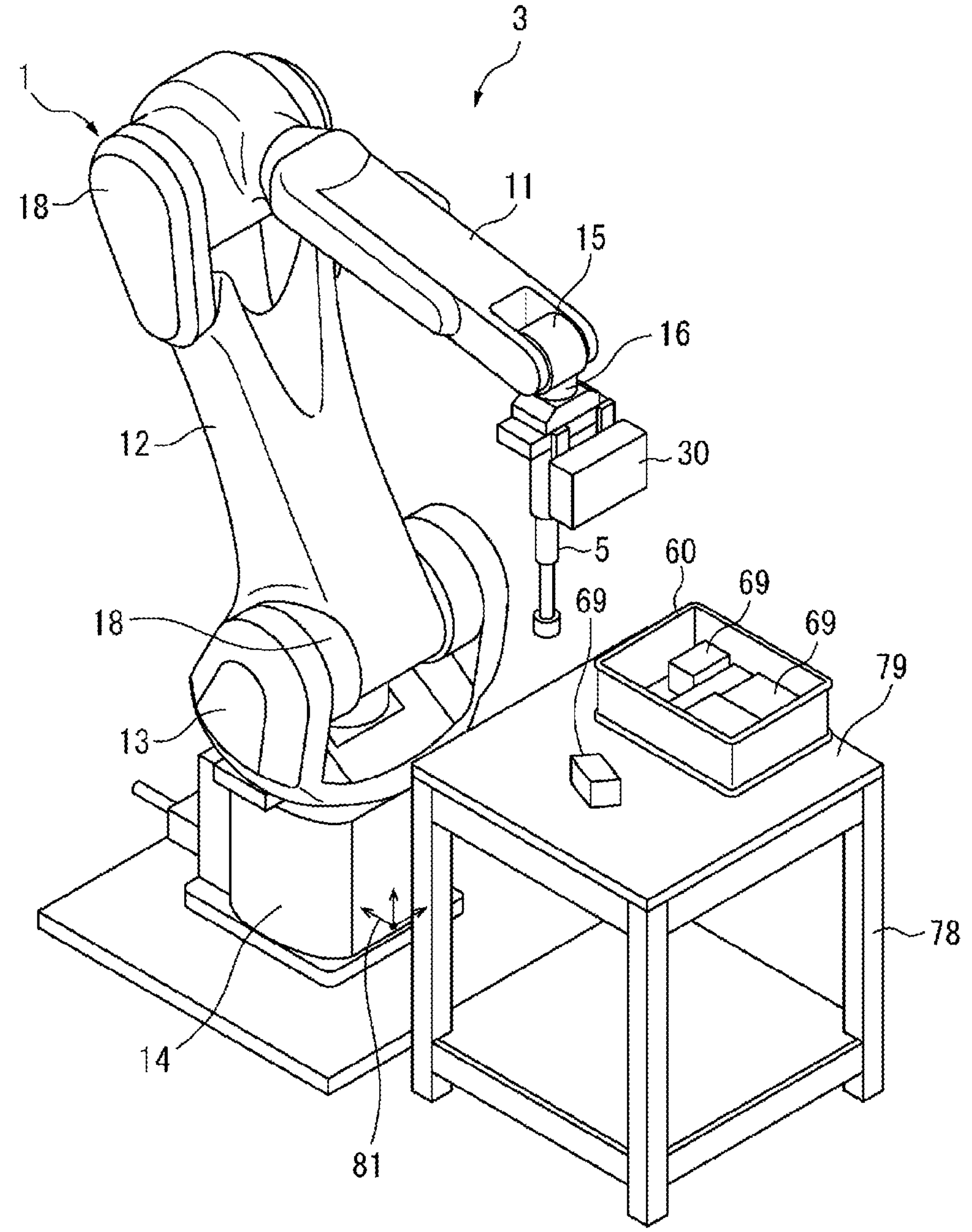
FIG. 1 is a perspective view of a robot apparatus in an embodiment.
Figure 2:
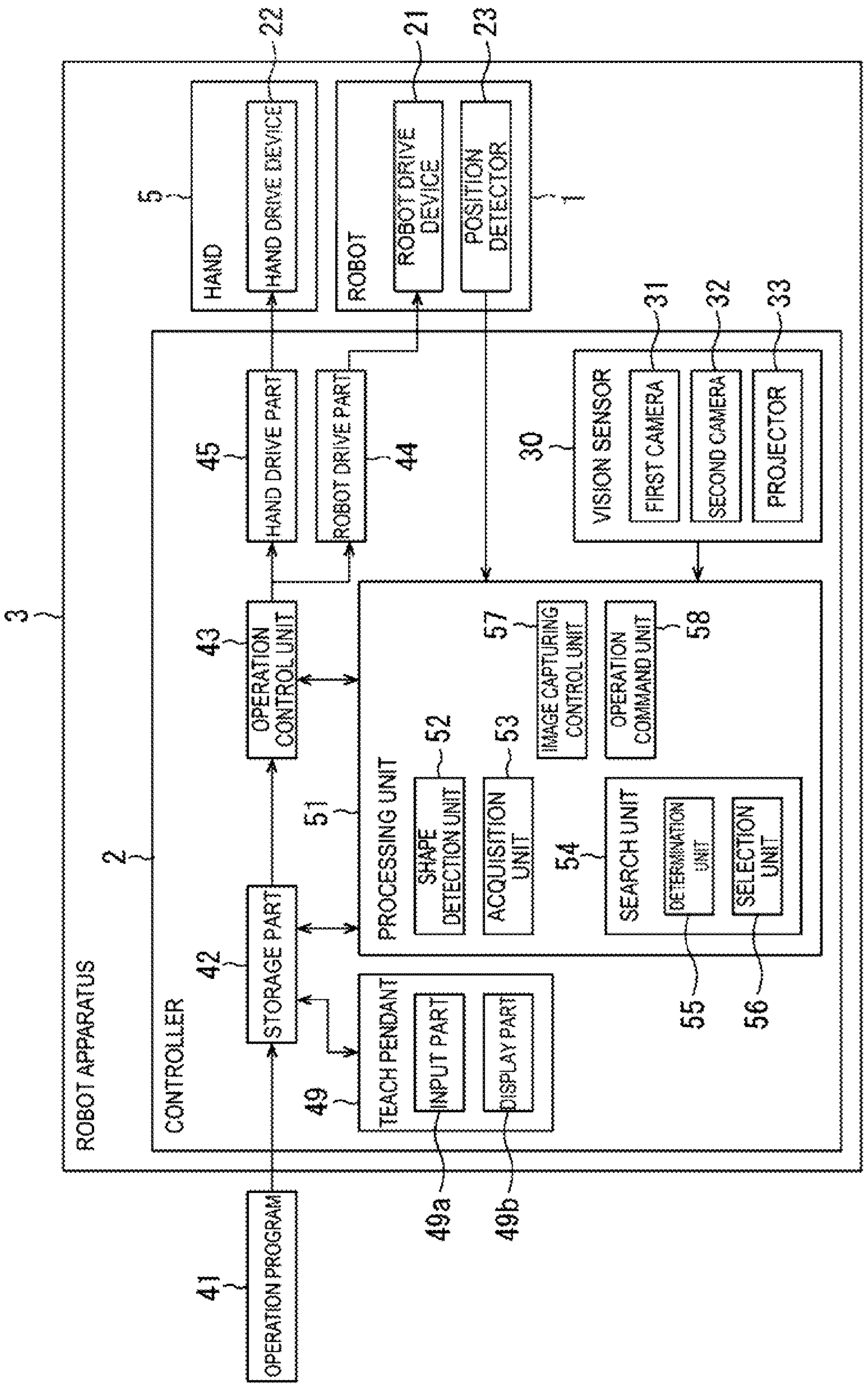
FIG. 2 is a block diagram of the robot apparatus.

FIG. 1 is a perspective view of a robot apparatus in the present embodiment. FIG. 2 is a block diagram of the robot apparatus in the present embodiment. With reference to FIG. 1 and FIG. 2, a robot apparatus 3 arranges, in a container 60, a workpiece 69 arranged on a top face of a top plate 79 of a platform 78. The workpiece 69 of the present embodiment is a box having a rectangular parallelepiped shape. The container 60 functions as a support member that supports the workpiece 69 from a lower side. The container 60 of the present embodiment has a shape of a box, and is open in an upper portion. The support member of the workpiece 69 is not limited to the container 60, and any member that supports a workpiece can be employed. For example, a pallet for conveying the workpiece 69 can be employed as a support member.

The robot apparatus 3 includes a hand 5 as an operation tool that grips the workpiece 69, and a robot 1 that moves the hand 5. The robot apparatus 3 includes a controller 2 that controls the robot 1 and the hand 5. The hand 5 of the present embodiment is a suction hand that grips a top face of the workpiece 69 by suction. The operation tool attached to the robot 1 is not limited to this embodiment. Any operation tool that can grip a workpiece by the robot apparatus 3 can be employed. For example, an operation tool that sandwiches a workpiece between claw parts facing each other, an operation tool that grips a workpiece by a magnetic force, or the like can be employed.

The robot 1 of the present embodiment is an articulated robot including a plurality of joints 18. The robot 1 includes an upper arm 11 and a lower arm 12. The lower arm 12 is supported by a turning base 13. The turning base 13 is supported by a base 14. The robot 1 includes a wrist 15 that is coupled to an end portion of the upper arm 11. The wrist 15 includes a flange 16 that fixes the hand 5. The robot is not limited to this embodiment, and any robot that can move an operation tool can be employed.

A world coordinate system 81 that is immovable when a position and an orientation of the robot 1 change is set to the robot apparatus 3 of the present embodiment. The world coordinate system 81 is also referred to as a reference coordinate system. In the world coordinate system 81, the position of the origin is fixed, and further, the directions of the coordinate axes are fixed. Additionally, in the robot apparatus 3, a tool coordinate system having an origin set at any position of the operation tool is set. The position and the orientation of the tool coordinate system change together with the hand 5. For example, the position of the robot 1 corresponds to a position of the tool tip point (e.g., the position of the origin of the tool coordinate system). Furthermore, the orientation of the robot 1 corresponds to the orientation of the tool coordinate system with respect to the world coordinate system 81.

In the robot apparatus 3 of the present embodiment, the controller 2 functions as a position setting device. The controller 2 includes a sensor for detecting a shape of the workpiece 69. The sensor of the present embodiment is a vision sensor 30 for generating position information of a three-dimensional measurement point corresponding to a surface of the workpiece 69. The vision sensor 30 of the present embodiment is a stereo camera including a first camera 31 and a second camera 32. Additionally, the vision sensor 30 includes a projector 33 that projects light having a pattern, such as a stripe pattern, to a workpiece.

The vision sensor 30 is fixed to a base of the hand 5. A position and an orientation of the vision sensor 30 change as a position and an orientation of the robot 1 change. The vision sensor 30 is not limited to this embodiment, and can be arranged so as to capture the workpiece 69 arranged on the platform 78. For example, the vision sensor 30 may be fixed to a fixing member fixed to the platform.

The robot 1 of the present embodiment includes a robot drive device 21 that drives constituent members, such as the upper arm 11. The robot drive device 21 includes a plurality of drive motors for driving the upper arm 11, the lower arm 12, the turning base 13, and the wrist 15. The hand 5 includes a hand drive device 22 that drives the hand 5. The hand drive device 22 of the present embodiment drives the hand 5 by air pressure. The hand drive device 22 includes, for example, a pump and an electromagnetic valve for decompressing an interior space of a suction pad.

The controller 2 includes an arithmetic processing device (computer) which includes a Central Processing Unit (CPU) as a processor. The arithmetic processing device includes a Random Access Memory (RAM), a Read Only Memory (ROM), or the like, which are mutually connected to the CPU via a bus. The robot apparatus 3 of the present embodiment automatically conveys the workpiece 69 based on an operation program 41. The robot drive device 21 and the hand drive device 22 are controlled by the controller 2.

The controller 2 includes a input part 42 for storing information relating to the control of the robot apparatus 3. The input part 42 can be configured of a storage medium capable of storing information, such as a volatile memory, a non-volatile memory, a hard disk, or the like. The operation program 41 created in advance for operating the robot 1 is input to the controller 2. The operation program 41 is stored in the input part 42.

The controller 2 includes an operation control unit 43 for transmitting an operation command. The operation control unit 43 transmits an operation command for driving the robot 1 to a robot drive part 44 based on the operation program 41. The robot drive part 44 includes an electric circuit that drives a drive motor. The robot drive part 44 supplies electricity to the robot drive device 21 based on the operation command. The operation control unit 43 transmits an operation command for driving the hand drive device 22 to a hand drive part 45. The hand drive part 45 includes an electric circuit that drives, for example, a pump. The hand drive part 45 supplies electricity to the pump and the like based on the operation command.

The operation control unit 43 corresponds to a processor that operates in accordance with the operation program 41. The processor reads the operation program 41 and functions as the operation control unit 43 by performing the control that is defined in the operation program 41.

The robot 1 includes a state detector for detecting a position and an orientation of the robot 1. The state detector of the present embodiment includes a position detector 23 attached to the drive motor of each drive axis of the robot drive device 21. By the output from the position detector 23, a position and an orientation of the robot 1 are detected. The state detector is not limited to the position detector attached to the drive motor, and any detector that allows detecting the position and the orientation of the robot 1 can be employed.

The controller 2 includes a teach pendant 49 as an operation panel for operating the robot apparatus 3 by an operator. The teach pendant 49 includes an input part 49*a* for inputting information on the robot 1, the hand 5, and the vision sensor 30. The input part 49*a* is configured with a member, such as a keyboard and a dial. The teach pendant 49 includes a display part 49*b* that displays information on the control of the robot apparatus 3. The display part 49*b* is configured with a display panel, such as a liquid crystal display panel.

The controller 2 includes a processing unit 51 that captures an image of the workpiece 69 by the vision sensor 30 and generates an operation command for arranging the workpiece 69 in the container 60. The processing unit 51 includes a shape detection unit 52 that detects a shape of the workpiece 69 conveyed to the container 60, based on an output from the vision sensor 30. The processing unit 51 includes an acquisition unit 53 that acquires a shape and a position of the workpiece 69 arranged in the container 60. The processing unit 51 includes a search unit 54 that searches for a position where the workpiece 69 conveyed by the robot 1 is arranged, based on a position of the workpiece 69 arranged in the container 60. The search unit 54 includes a determination unit 55 that determines whether a position where the workpiece 69 conveyed by the robot 1 is arranged in the container 60 is allowed. The search unit 54 includes a selection unit 56 that selects a position where the workpiece 69 is arranged when an arrangement of the workpiece 69 in a plurality of positions in the container 60 is allowed.

Further, the processing unit 51 includes an image capturing control unit 57 that transmits a command for capturing an image to the vision sensor 30. The processing unit 51 includes an operation command unit 58 that generates an operation command for driving the robot 1, based on a position, set by the search unit 54, where the workpiece 69 is arranged with respect to the container 60.

The processing unit 51 described above is equivalent to the processor that operates in accordance with the operation program 41. Especially, each unit of the shape detection unit 52, the acquisition unit 53, the search unit 54, the determination unit 55, and the selection unit 56 is equivalent to the processor that operates in accordance with the operation program 41. The image capturing control unit 57 and the operation command unit 58 are equivalent to the processor that operates in accordance with the operation program 41. The processor functions as each unit by reading the operation program 41 and performing the control that is defined by the operation program 41.

The shape detection unit 52 of the processing unit 51 detects a shape of the workpiece 69 based on an output from the vision sensor 30. The shape detection unit 52 acquires a two-dimensional image captured by the two cameras 31 and 32. The shape detection unit 52 calculates a distance from the vision sensor 30 to a specific part, based on the parallax of the specific part in an image captured by the first camera 31 and an image captured by the second camera 32.

In addition, the shape detection unit 52 can calculate three-dimensional positions of measurement points set on the surface of the workpiece 69, based on a distance to the specific part and positions of the two cameras 31 and 32. The shape detection unit 52 can detect a shape including the dimensions of the workpiece 69, based on position information on measurement points set on the surface of the workpiece 69. In addition, the shape detection unit 52 can detect a position and an orientation of the workpiece 69.

Note that a sensor that detects a shape of a workpiece is not limited to a stereo camera, and any sensor that can detect a shape of a workpiece can be employed. For example, a sensor such as a Time of Flight (TOF) camera that can detect three-dimensional positions of measurement points on a surface of a workpiece can be employed. Alternatively, a contact sensor that can detect a shape of a workpiece by bringing a probe into contact with the workpiece, or the like may be employed.

The robot apparatus 3 of the present embodiment performs control of arranging, in the container 60, the workpiece 69 placed on the platform 78. The workpiece 69 is supplied to the platform 78 by an operator, a convey device, or the like. Before the hand 5 of the robot apparatus 3 grips the workpiece 69, the robot 1 arranges the vision sensor 30 above the workpiece 69 arranged on the platform 78. The image capturing control unit 57 transmits a command for capturing an image to the vision sensor 30. The vision sensor 30 captures an image of the workpiece 69. The shape detection unit 52 detects a shape of the workpiece 69 and a position and an orientation of the workpiece 69. In particular, the shape detection unit 52 of the present embodiment detects a height, and dimensions of sides when the workpiece 69 is viewed in a plan view.

A camera coordinate system is set to the vision sensor 30. The shape detection unit 52 can calculate a position of a measurement point set on the surface of the workpiece 69 at a coordinate value of the camera coordinate system. The shape detection unit 52 can convert position information on a measurement point of the workpiece 69 expressed at the camera coordinate system into position information on a measurement point of the workpiece 69 expressed at the world coordinate system 81, based on a position and an orientation of the robot 1. The dimensions of a workpiece can be detected based on position information on a measurement point.

A position of a surface of the top plate 79 of the platform 78 can be predetermined. The shape detection unit 52 can detect a height of the workpiece 69 from a difference between a position of the surface of the top plate 79 and a position of the top face of the workpiece 69. The shape detection unit 52 is not limited to this embodiment, and a shape and a height of a surface of a workpiece can be detected by any control. For example, a robot may change a position and an orientation of a vision sensor, and capture an image from an oblique direction of a workpiece. By the control, a planar shape and a shape of a side surface can be detected.

In the present embodiment, information on a shape of all the workpieces 69 arranged inside the container 60 and a position of the workpiece 69 in the container 60 are stored in the input part 42. The information on the shape of the workpiece 69 includes dimensions of the workpiece 69. In the present embodiment, the information on the shape of the workpiece 69 includes a length of each side of the workpiece 69 having the rectangular parallelepiped shape. As a position of the workpiece 69, for example, a position of the center of gravity of a shape of the top face of the workpiece 69 or a position of the center of gravity of a three-dimensional shape of the workpiece 69 can be exemplified.

The acquisition unit 53 of the processing unit 51 acquires information on a shape and a position of the workpiece 69 that has been already arranged in the container 60. The search unit 54 sets a position where the workpiece 69 is newly arranged, based on the information on the workpiece 69 that has been arranged in the container 60. The operation command unit 58 transmits the command for driving the robot 1 to the operation control unit 43 so as to grip the workpiece 69, based on the position and the orientation of the workpiece 69 placed on the platform 78. The operation command unit 58 transmits the command for driving the robot 1 to the operation control unit 43 so as to convey the workpiece 69 to the position set by the search unit 54. The operation control unit 43 drives the robot 1 and the hand 5 based on the operation command from the operation command unit 58, and conveys the workpiece 69 from the platform 78 to the container 60.

Note that, in the present embodiment, a position of the container 60 on the top plate 79 of the platform 78 is predetermined. A position and a shape of a base surface of the container 60 and a position and a shape of a wall face of the container 60 are predetermined. In other words, an arrangement region where the plurality of workpieces 69 are arranged with respect to the container 60 is predetermined. However, a position of the container 60 may be slightly shifted when the container 60 is placed on the top plate 79. The robot apparatus 3 of the present embodiment can capture an image of the container 60 by the vision sensor 30 after the container 60 is placed on the top plate 79. Then, a position of the container 60 may be detected, and a position and a shape of the base surface and a position and a shape of the wall face of the container 60 may be corrected. In other words, the arrangement region where the workpiece 69 is arranged may be corrected.

In the present embodiment, the size of the workpiece 69 arranged in the container 60, the number of the workpiece 69, and the order in which the workpiece 69 is stacked are not determined. The robot apparatus 3 arranges a plurality of types of the workpieces 69 in the container 60. The workpiece 69 of the present embodiment includes a top face and a bottom face that are parallel to each other. The plurality of workpieces 69 have sizes different from each other. In other words, each of the workpieces 69 has a different height and different dimensions in the top face and the bottom face. Note that the workpieces 69 having the same size may be included.

In the following description, control of setting a position where a workpiece is arranged with respect to the container 60 by the processing unit 51 will be described. In the present embodiment, a position in the container 60, where each one workpiece 69 conveyed to the platform 78 is to be arranged, is searched. Before the search unit 54 searches for the position where the workpiece is arranged, the workpiece 69 arranged on the platform 78 is captured by the vision sensor 30. The shape detection unit 52 detects a shape, a position, and an orientation of the workpiece 69. The acquisition unit 53 acquires, from the input part 42, the information on the shape of the workpiece 69 arranged in the container 60 and the information on the position in the container 60. After the search unit 54 decides the position where the workpiece 69 is arranged, the input part 42 stores the shape of the workpiece 69 arranged in the container 60 and the position of the workpiece 69 in the container 60. The robot apparatus 3 grips the workpiece 69 arranged on the platform 78 by the hand 5. The robot apparatus 3 arranges the workpiece 69 in the position determined by the search unit 54. The control can be performed each time one workpiece 69 is arranged in the container 60.

Figure 3:
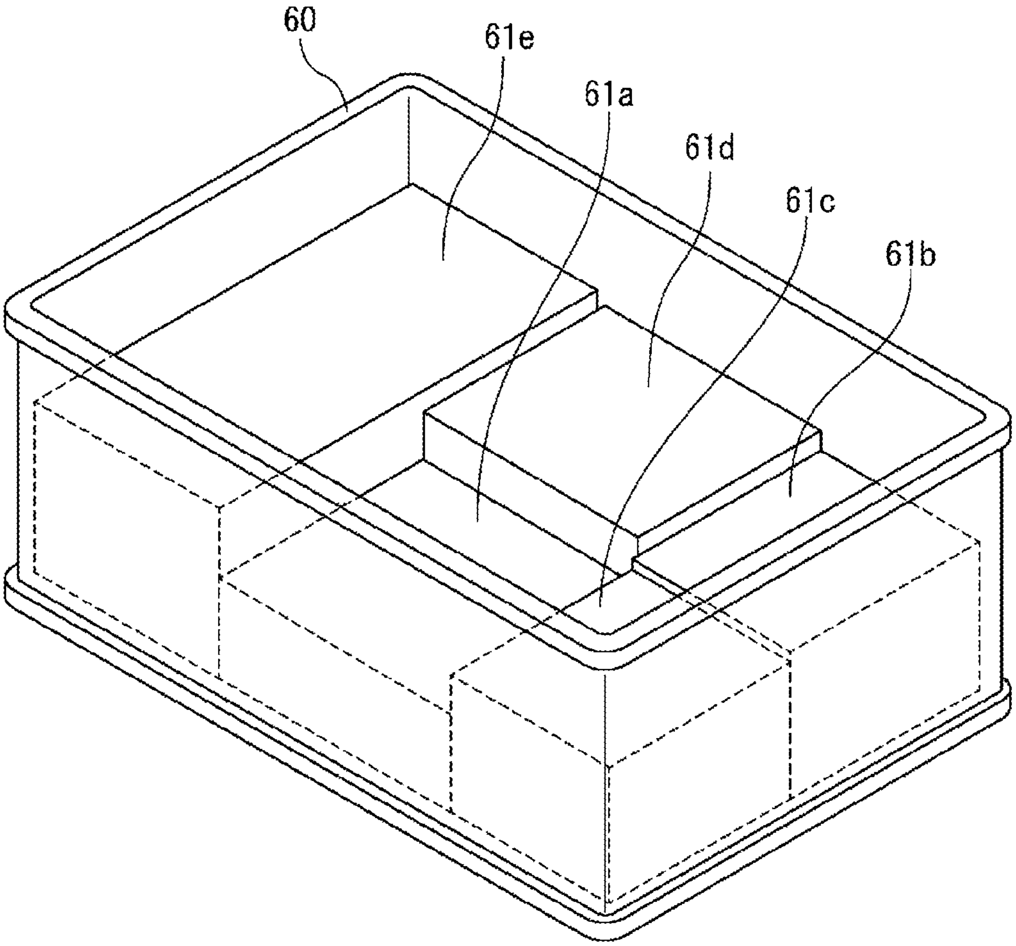
FIG. 3 is a perspective view of a container and a workpiece when the workpiece of a first stage is arranged in the container.

FIG. 3 illustrates a perspective view of workpieces and a container when an arrangement of the workpieces of a first stage in the container is completed. Workpieces 61*a* to 61*e* of a first stage are arranged inside the container 60. The workpieces are arranged in the plurality of stages inside the container 60. In other words, an operation of stacking the workpieces inside the container 60 is performed. In the present embodiment, for the workpieces of the plurality of stages arranged in the container 60, a workpiece arranged on a lower side is referred to as a first workpiece, and a workpiece stacked on an upper side of the first workpiece is referred to as a second workpiece. The first workpiece is a lower side workpiece, and the second workpiece is an upper side workpiece. In the example here, the workpieces 61*a* to 61*e* correspond to the first workpiece.

Figure 4:
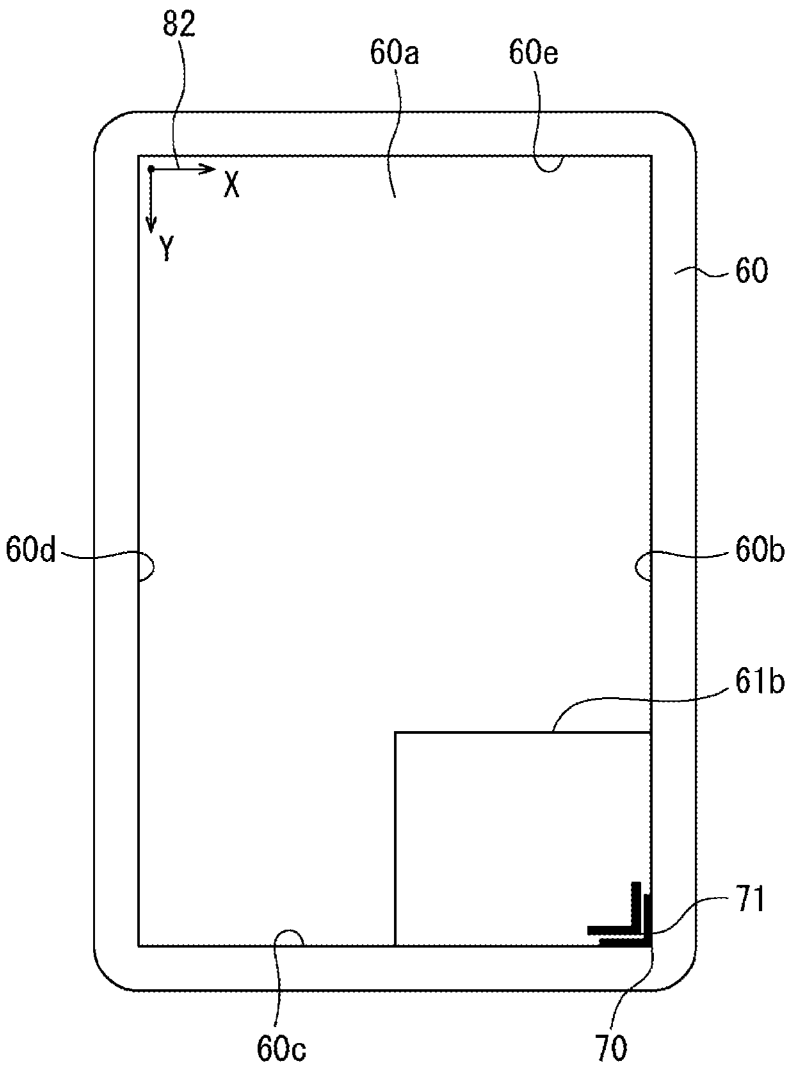
FIG. 4 is a plan view of the container for describing a first step of control of arranging the workpiece of the first stage in the container.

FIG. 4 illustrates a plan view of the container for describing a first step of arranging the workpieces of the first stage inside the container. The container 60 includes a base surface 60*a* and wall faces 60*b* to 60*e* provided upright from the base surface 60*a*. The workpiece of the first stage is placed on the base surface 60*a* of the container 60. The workpiece coordinate system 82 is set to the container 60. The workpiece coordinate system 82 is a coordinate system fixed to the container 60. An origin of the workpiece coordinate system 82 according to the present embodiment is arranged at a corner of the base surface 60*a*. The search unit 54 of the processing unit 51 sets a position where the first workpieces 61*a* to 61*e* are arranged on the base surface 60*a*.

First, the search unit 54 searches for a position where the first workpiece 61*b* is arranged. When the first workpiece 61*b* is arranged in the container 60, no workpiece is arranged inside the container 60. Thus, the acquisition unit 53 acquires information on a shape and a position of the container 60. In the present embodiment, a base point 70 serving as a reference is preset at the corner of the base surface 60*a* of the container 60. The base point 70 is set in a position where the wall faces 60*b* and 60*c* are in contact with the base surface 60*a*. The base point 70 is preferably set to a position where there is less motion of the robot 1 for moving the workpiece.

Additionally, a base point 71 is preset at a corner of a bottom face of the workpiece 61*b*. The search unit 54 arranges the workpiece 61*b* such that the base point 71 overlaps the base point 70. Note that, in the drawings, when the base points overlap each other, one of the base points is described in a slightly shifted position. The determination unit 55 determines whether the workpiece 61*b* interferes with the other workpiece or the container 60. The determination unit 55 determines that the workpiece 61*b* does not interfere with the other workpiece or the container 60. Then, the search unit 54 decides the position of the workpiece 61*b*.

Figure 5:
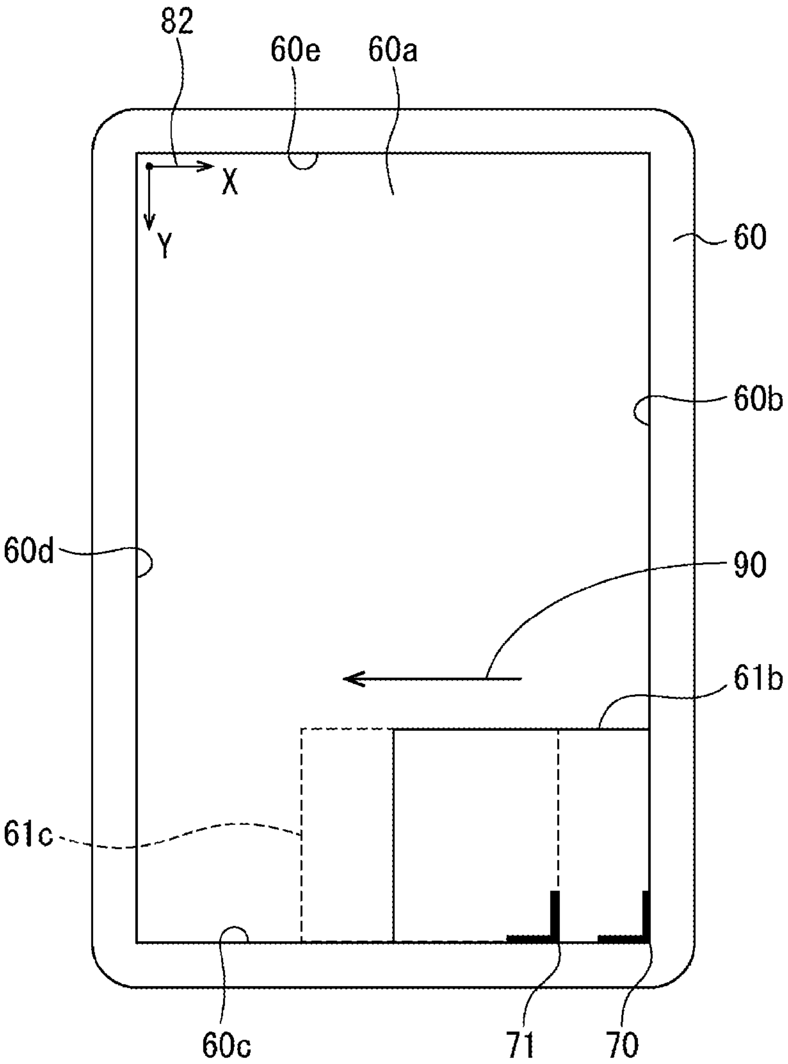
FIG. 5 is a plan view of the container for describing a second step of the control of arranging the workpiece of the first stage in the container.

FIG. 5 illustrates a plan view of the container for describing a second step of the control of arranging the workpiece of the first stage in the container. The processing unit 51 sets a position where the first workpiece 61*c* is arranged. The search unit 54 arranges the base point 71 of the workpiece 61*c* so as to overlap the base point 70 of the container 60. Since the workpiece 61*b* is already arranged inside the container 60, the determination unit 55 determines that the workpiece 61*c* interferes with the workpiece 61*b*.

The search unit 54 moves the workpiece 61*c* in a predetermined direction. In the present embodiment, as indicated by an arrow 90, control of moving the workpiece 61*c* in an X-axis direction (direction along a short side of the container 60) of the workpiece coordinate system 82 is performed. The search unit 54 moves the workpiece 61*c* by a predetermined minute distance. The determination unit 55 determines whether the workpiece 61*c* interferes with the workpiece 61*b* and the container 60. The search unit 54 repeats the movement by a minute distance and the determination.

Figure 6:
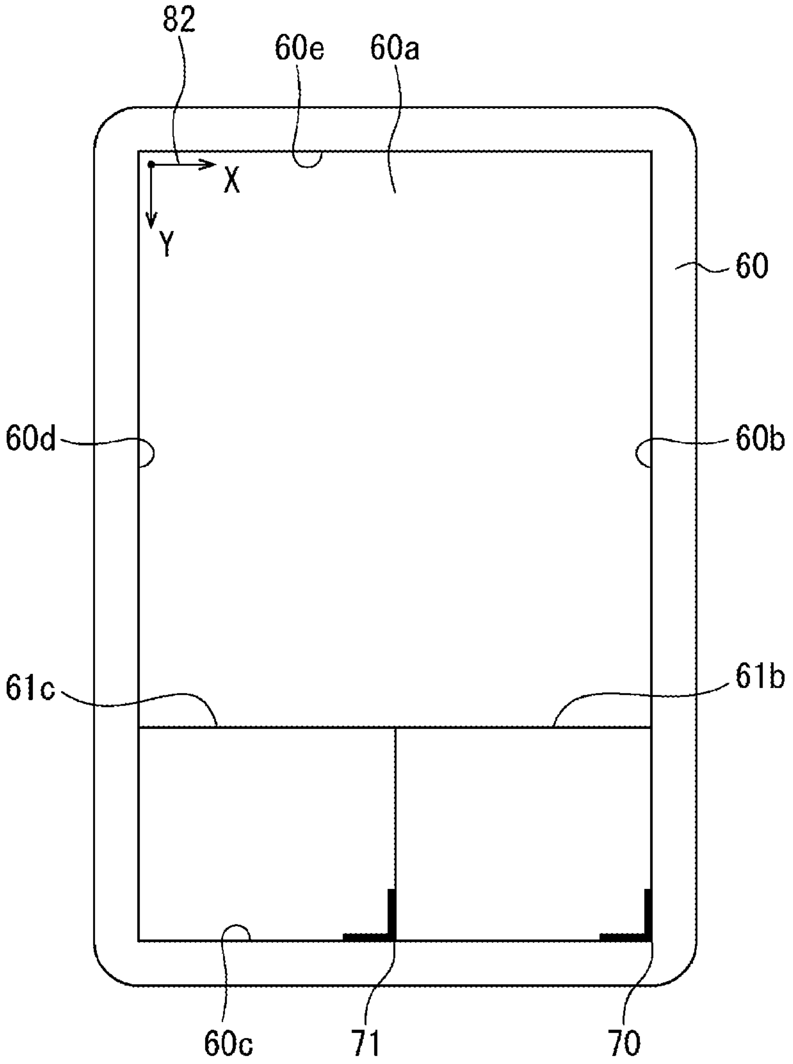
FIG. 6 is a plan view of the container for describing a third step of the control of arranging the workpiece of the first stage in the container.

FIG. 6 illustrates a plan view of the container for describing a third step of the control of arranging the workpiece of the first stage in the container. In the example here, when the workpiece 61*c* moves to a position where a side surface of the workpiece 61*c* is in contact with a side surface of the workpiece 61*b*, the determination unit 55 determines that the workpiece 61*c* does not interfere with the workpiece 61*b* and the container 60. The determination unit 55 decides that the workpiece 61*c* is arranged in the position.

Figure 7:
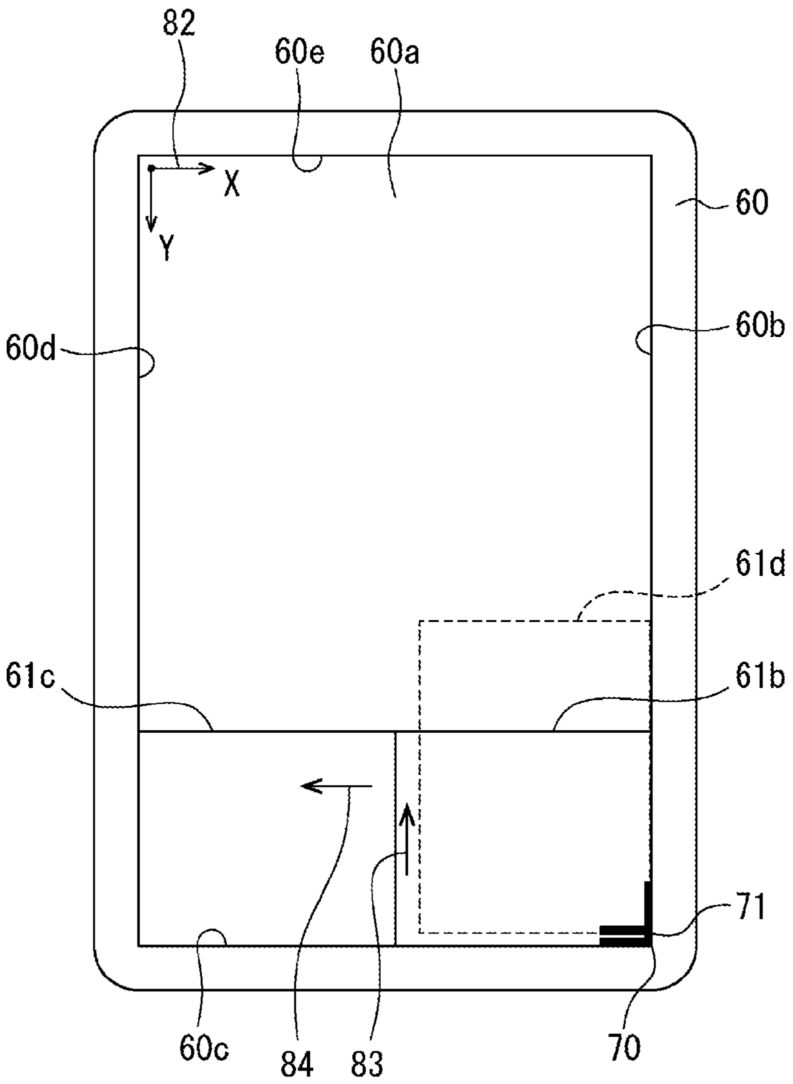
FIG. 7 is a plan view of the container for describing a fourth step of the control of arranging the workpiece of the first stage in the container.

FIG. 7 illustrates a plan view of the container for describing a fourth step of the control of arranging the workpiece of the first stage in the container. Next, when the first workpiece 61*d* is arranged, the search unit 54 arranges the workpiece 61*d* such that the base point 71 set for the workpiece 61*d* overlaps the base point 70 of the container 60. The determination unit 55 determines that the workpiece 61*d* interferes with the workpiece 61*b* in this position.

Next, the search unit 54 moves the workpiece 61*d* in a direction parallel to an X axis of the workpiece coordinate system 82, and determines whether the interference occurs. The control is repeated until the workpiece 61*d* interferes with the wall face 60*d*. Even when the workpiece 61*d* moves to the position where a surface of the workpiece 61*d* is in contact with the wall face 60*d*, the workpiece 61*d* interferes with the other workpiece 61*c*. Thus, the search unit 54 returns the workpiece 61*d* to the position where the base point 71 overlaps the base point 70 of the container 60.

Next, as indicated by an arrow 83, the search unit 54 moves the workpiece 61*d* in a direction (direction along a long side of the container 60) parallel to a Y axis of the workpiece coordinate system 82. The search unit 54 moves the workpiece 61*d* by a minute distance. Next, the search unit 54 searches for a position where the workpiece 61*d* can be arranged without the interference while moving the workpiece 61*d* by a minute distance in the direction parallel to the X-axis direction of the workpiece coordinate system

82 as indicated by an arrow 84. The movement is performed until the workpiece 61*d* interferes with the wall face 60*d* of the container 60.

In this way, the search unit 54 repeats the movement in the X-axis direction and the movement in the Y-axis direction of the workpiece coordinate system 82. The search unit 54 sets, as a position where the workpiece 61*d* is arranged, a position where the workpiece 61*d* can be arranged without interfering with another object. In the example here, the workpiece 61*d* can be arranged in a position where a side surface of the workpiece 61*d* is in contact with a side surface of the workpiece 61*b* and the wall face 60*b* of the container 60. The search unit 54 decides the position where the workpiece 61*d* is arranged.

In order to arrange the next first workpiece on the base surface 60*a* of the container 60, the control of setting a position of the first workpiece is similar to the control of setting a position of the first workpiece described above. The search unit 54 ends the control when the workpiece interferes with the wall face 60*e*.

In this way, the search unit 54 can determine whether the interference occurs with another object while moving a workpiece by a minute distance in a predetermined direction. In the example here, the search unit 54 repeats the movement in the X-axis direction and the movement in the Y-axis direction of the workpiece coordinate system 82, and determines whether the workpiece can be arranged. By adopting this control, positions where the first workpieces 61*a* to 61*e* are arranged on the base surface 60*a* of the container 60 can be set. Additionally, since a position of the workpiece is set with reference to the base point 70 of the container 60, a plurality of workpieces can be arranged so as to be close to the base point 70. In the present embodiment, the base point 70 is set to a position where the drive amount of the robot 1 decreases. Thus, when the first workpieces 61*a* to 61*e* are conveyed, the drive amount of the robot 1 decreases. As a result, the first workpieces 61*a* to 61*e* can be conveyed in a short period of time.

Note that, when it is determined that there is no position where a workpiece does not interfere with another object, the similar control may be performed in a state where the workpiece is rotated at a predetermined rotation angle. In the present embodiment, a planar shape of the workpiece is a rectangle. Thus, the above-described control can be performed in a state where the workpiece is rotated 90° about the rotation axis perpendicular to the base surface 60*a*. For example, after the interference of the workpiece is determined while moving the workpiece in the Y-axis direction of the workpiece coordinate system 82, the workpiece may be rotated 90°, and the movement in the Y-axis direction and the determination of the interference of the workpiece may be then performed.

The control of setting a position where the workpiece is arranged on the base surface 60*a* of the container 60 is not limited to the above-described configuration, and any control can be performed. For example, the search unit detects a corner of a region where a base surface of a container is exposed. Then, the search unit may arrange a workpiece such that a base point of the workpiece overlaps the corner, and determine whether the interference occurs.

Next, control of stacking the second workpiece on the upper side of the first workpiece will be described. Information on a shape of the first workpieces 61*a* to 61*e* arranged in the container 60 and information on each position of the first workpieces 61*a* to 61*e* inside the container 60 are stored in the input part 42 of the present embodiment. The acquisition unit 53 acquires, from the input part 42, the information on the workpieces 61*a* to 61*e* arranged inside the container 60.

Figure 8:
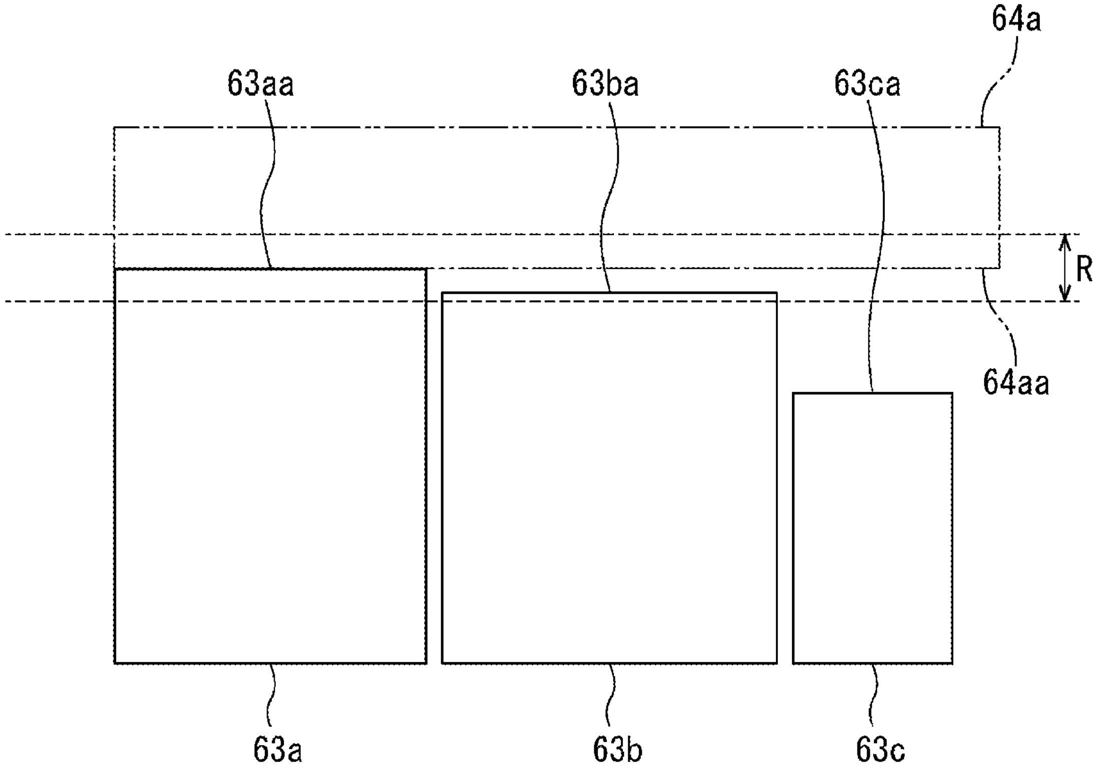
FIG. 8 is a side view of a first workpiece and a second workpiece for describing an example in which stacking the second workpiece is allowed.

FIG. 8 illustrates a side view of the first workpiece and the second workpiece for describing an example in which the second workpiece is allowed to be arranged on the upper side of the plurality of first workpieces. In the example illustrated in FIG. 8, the determination unit 55 of the search unit 54 determines whether a second workpiece 64*a* is allowed to be arranged on an upper side of the first workpieces 63*a*, 63*b*, and 63*c* that are at lower side.

In the present embodiment, there are workpieces having various heights. When the plurality of workpieces are arranged in the container 60, heights of top faces of the workpieces may be different from each other. When a difference in height between the top faces of the first workpieces is small, the determination unit 55 allows the second workpiece to be arranged on the plurality of first workpieces. In other words, when positions of the top faces of the workpieces are slightly different, the determination unit 55 performs determination on the assumption that heights are substantially the same. As a height of the top face of the workpiece, for example, a height from the base surface 60*a* of the container 60 can be employed. Alternatively, as a height of the top face of the workpiece, a coordinate value in the world coordinate system 81 may be employed.

In the present embodiment, a determination range of a difference in height between the top face of one first workpiece and the top face of the other first workpiece is predetermined. The determination unit 55 selects one workpiece 63*a* as a reference workpiece, and sets a determination range R with respect to a position of a top face 63*aa* of the workpiece 63*a*. Then, when a difference in height between the top face 63*aa* of one workpiece 63*a* and a top face 63*b* a of the other workpiece 63*b* falls within the determination range, the determination unit 55 allows the second workpiece 64*a* to be arranged so as to be supported by both workpieces of the first workpiece 63*a* and the first workpiece 63*b*. In other words, when the top face 63*b* a of the first workpiece 63*b* is arranged inside the determination range R, the determination unit 55 allows the second workpiece 64*a* to be arranged across the workpiece 63*a* and the workpiece 63*b*.

On the other hand, when a difference in height between one first workpiece 63*a* and the other first workpiece 63*c* deviates from the determination range R, the determination unit 55 determines that a height of a top face 63*c* a is different from the height of the top face 63*a* a. The determination unit 55 prohibits the second workpiece 64*a* from being arranged so as to be supported by both workpieces of the first workpiece 63*a* and the first workpiece 63*c*. Alternatively, when the height of the first workpiece 63*c* is smaller than the determination range R, the determination unit 55 determines that the first workpiece 63*c* is not in contact with the second workpiece 64*a*.

Figure 9:
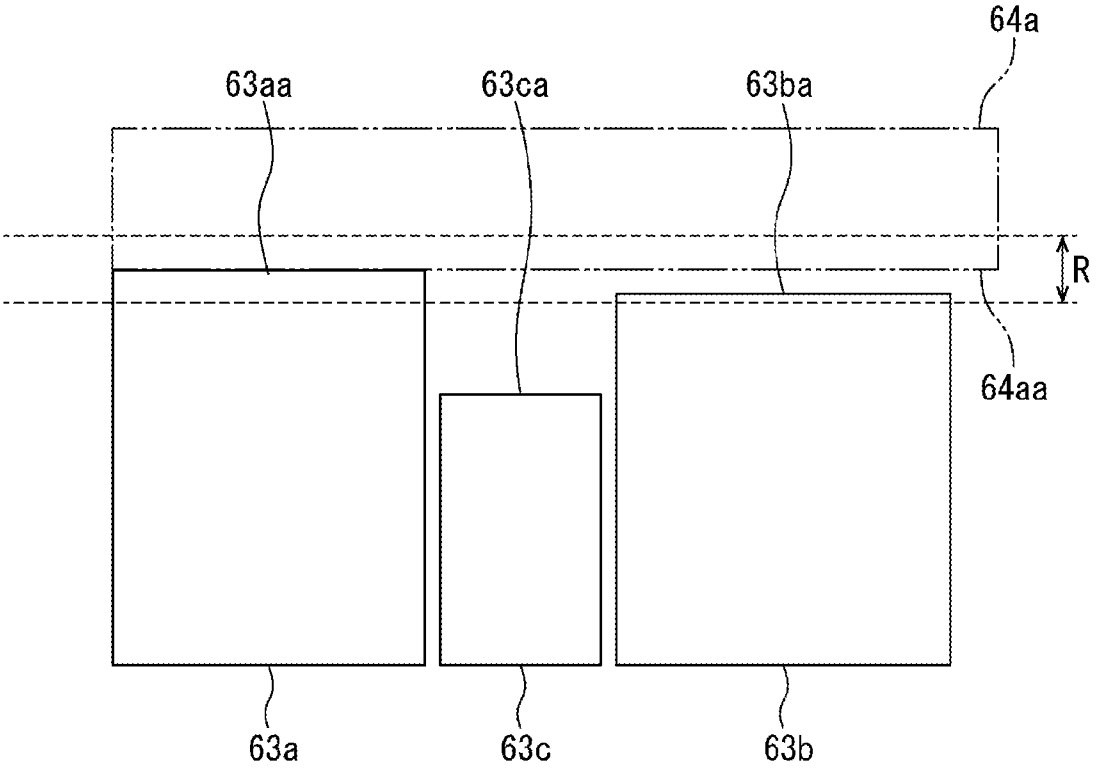
FIG. 9 is a side view of the first workpiece and the second workpiece for describing an example in which stacking the second workpiece is allowed.

FIG. 9 illustrates a side view of the first workpiece and the second workpiece for describing an example in which the second workpiece is allowed to be arranged on the upper side of the plurality of first workpieces. In the example illustrated in FIG. 9, the first workpiece 63*a* and the first workpiece 63*b* are arranged away from each other. The first workpiece 63*c* is arranged between the workpiece 63*a* and the workpiece 63*b*. Even in this case, the top face 63*b* a of the workpiece 63*b* is arranged within the determination range R related to the top face 63*aa* of the workpiece 63*a*. Thus, the determination unit 55 performs determination on the assumption that the top face 63*b* a has substantially the same height as the top face 63*a* a. The determination unit 55 allows the second workpiece 64*a* to be arranged so as to be supported by the top face 63*aa* of the workpiece 63*a* and the top face 63*b* a of the workpiece 63*b*.

Figure 10:
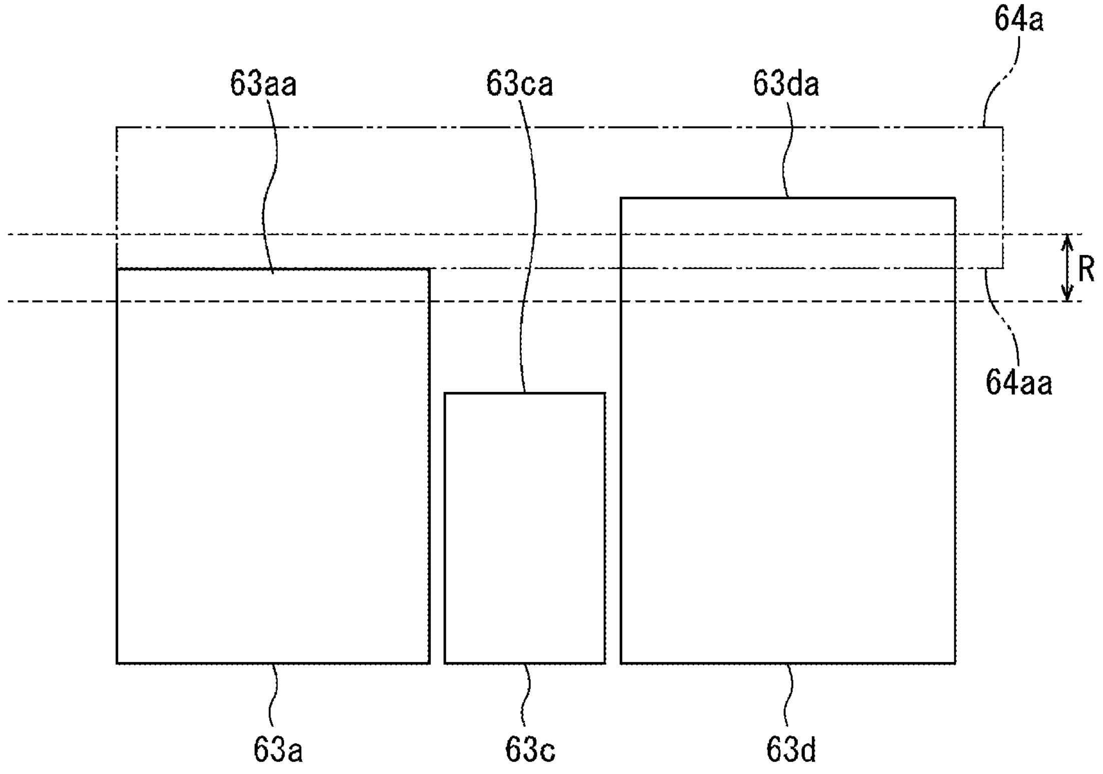
FIG. 10 is a side view of the first workpiece and the second workpiece for describing an example in which stacking the second workpiece is prohibited.

FIG. 10 illustrates a side view of the first workpiece and the second workpiece for describing an example in which the second workpiece is prohibited from being arranged on the upper side of the plurality of first workpieces. In the example illustrated in FIG. 10, the determination unit 55 determines whether the second workpiece 64*a* can be arranged on an upper side of the first workpieces 63*a*, 63*c* and 63*d*. A top face 63*da* of the workpiece 63*d* is arranged in a position deviating from the determination range R related to the top face 63*aa* of the workpiece 63*a*. Thus, the determination unit 55 prohibits the second workpiece 64*a* from being arranged so as to be supported by the first workpiece 63*a* and the first workpiece 63*d*. In the example here, the top face 63*d* a of the workpiece 63*d* is arranged in the position higher than an upper limit of the determination range R. Thus, the determination unit 55 determines that the second workpiece 64*a* interferes with the first workpiece 63*d* when the second workpiece 64*a* is arranged on the top face 63*aa* of the first workpiece 63*a*.

Figure 11:
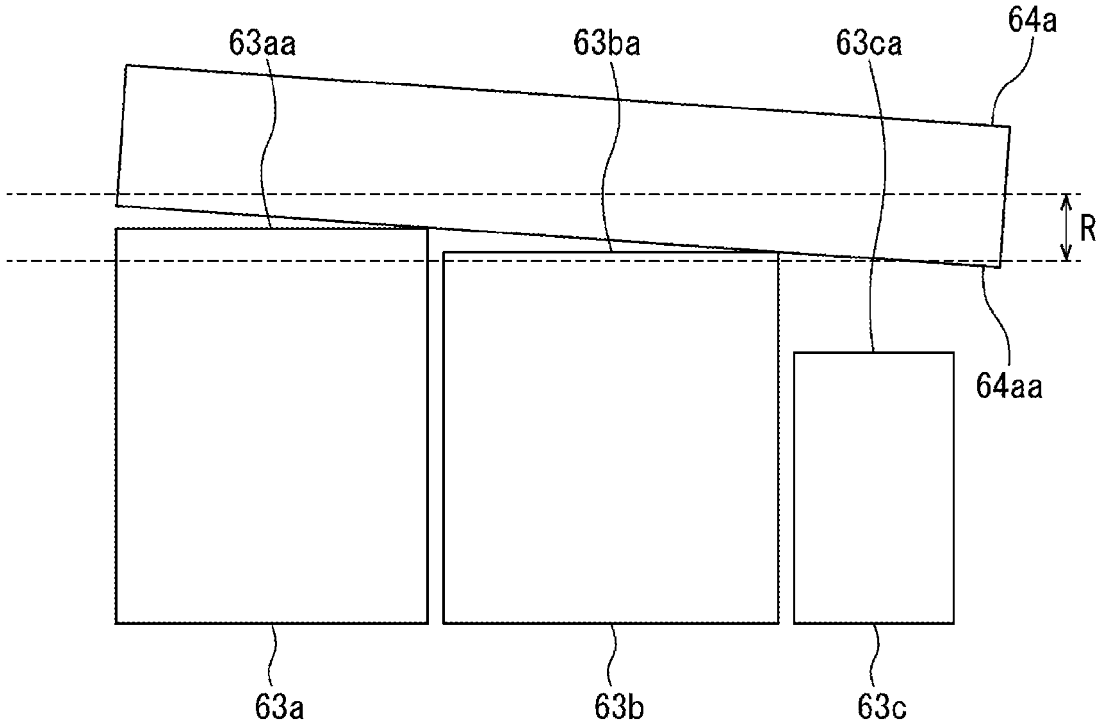
FIG. 11 is a side view of the first workpiece and the second workpiece when the second workpiece is arranged on an upper side of the first workpiece.

FIG. 11 illustrates a side view when the second workpiece is actually arranged on the upper side of the plurality of first workpieces. FIG. 11 is a side view when the second workpiece 64*a* is arranged on the upper side of the plurality of first workpieces 63*a*, 63*b*, and 63*c* illustrated in FIG. 8. The top face 63*aa* and the top face 63*b* a have slightly different heights. Thus, when the second workpiece 64*a* is arranged, the second workpiece 64*a* may be slightly inclined. In the control in the present embodiment, this slight inclination is allowed. Also in this case, as illustrated in FIG. 8, the search unit 54 performs calculation on the assumption that the second workpiece 64*a* is not inclined. In other words, also in the control of arranging the other workpiece on the top face of the workpiece 64*a*, the search unit 54 performs calculations on the assumption that the entire top face 63*aa* of the workpiece 63*a* is in contact with a bottom face of the workpiece 64*a*. The search unit 54 performs calculation on the assumption that the top face and the bottom face of each workpiece are parallel to the base surface of the container.

A determination range related to a difference in height of a top face of a workpiece is preferably set to be small such that a collapse of the workpiece does not occur. The determination range depends on a shape, a size, a weight, and the like of the workpiece. The determination range can be set in a range of ±5 mm for a position of a top face of a workpiece serving as a reference, for example.

In this way, the determination unit 55 of the present embodiment performs the determination of a position of the top face of the first workpiece in a height direction in order to stably arrange the second workpiece on the upper side of the plurality of first workpieces. Furthermore, in addition to the determination of a position of the top face of the workpiece in the height direction, the determination unit 55 performs the determination of a size and a position of a region where the second workpiece faces the first workpiece.

Figure 12:
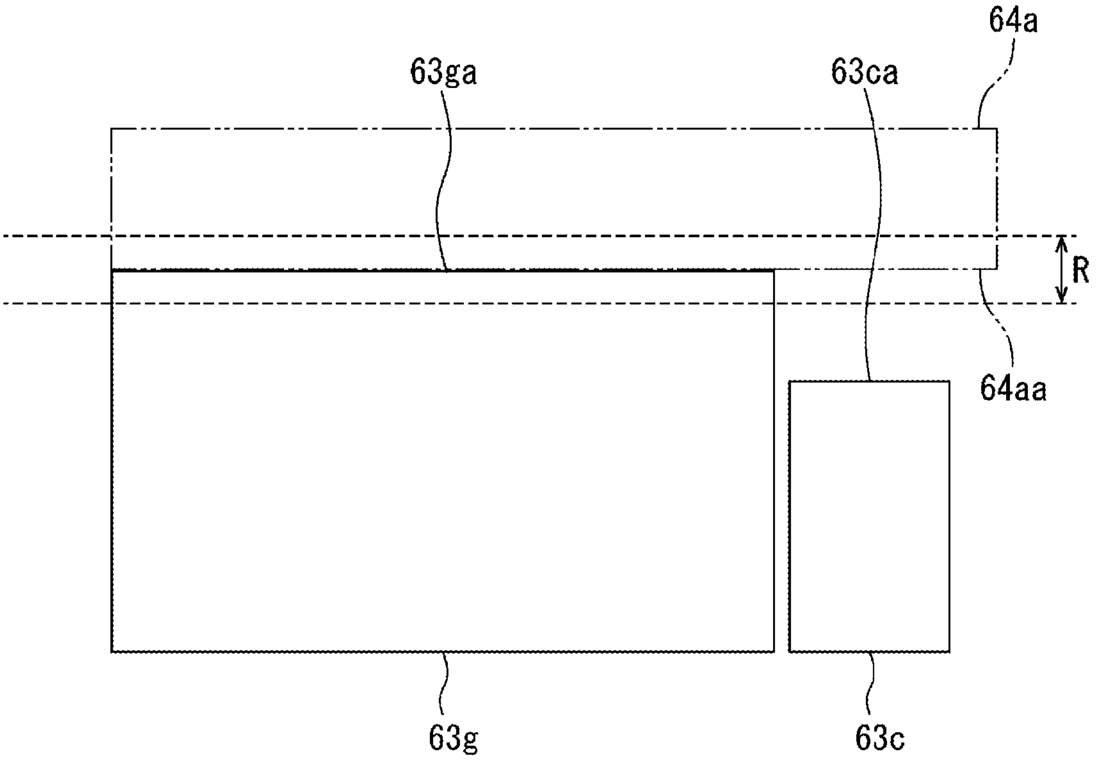
FIG. 12 is a side view of an example in which the second workpiece is allowed to be arranged on the upper side of the first workpiece.

FIG. 12 illustrates an example in which the second workpiece is allowed to be arranged on the upper side of the first workpiece. The determination unit 55 determines whether the second workpiece 64*a* can be arranged on an upper side of a first workpiece 63*g*. In a case where a surface area of a top face of the first workpiece is smaller than a surface area of a bottom face of the second workpiece, the second workpiece may be unstable when the second workpiece is arranged on the upper side of the first workpiece. In the example illustrated in FIG. 12, a position of the top face 63*ca* of the workpiece 63*c* deviates from the determination range R related to a top face 63*ga* of the workpiece 63*g*. Therefore, the second workpiece 64*a* is prohibited from being arranged so as to be supported by the workpiece 63*c*. On the other hand, an area where the top face 63*ga* of the workpiece 63*g* and a bottom face 64*aa* of the workpiece 64*a* face each other is large. In other words, an area where the top face 63*g* a and the bottom face 64*aa* are in contact with each other is large. In this case, the determination unit 55 allows the second workpiece 64*a* to be arranged on the top face of the first workpiece 63*g*.

Figure 13:
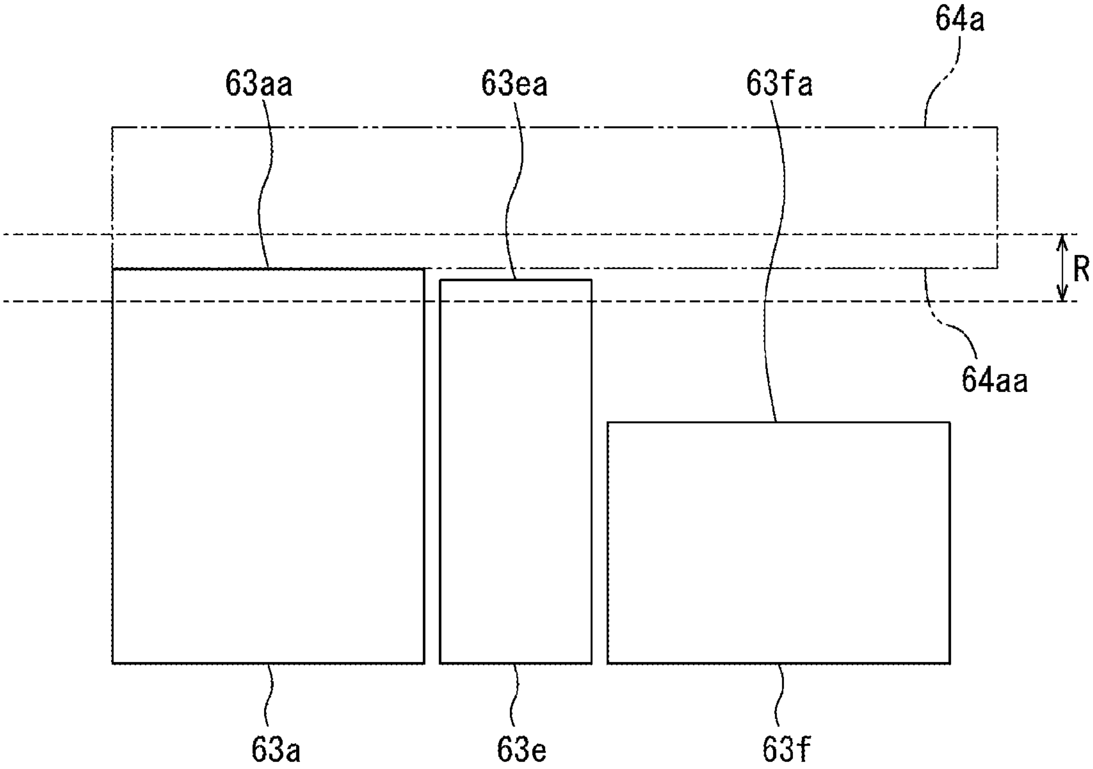
FIG. 13 is a side view of an example in which the second workpiece is prohibited from being arranged on the upper side of the first workpiece.

FIG. 13 illustrates an example in which the second workpiece is prohibited from being arranged on the upper side of the first workpiece. A position of a top face 63*fa* of a first workpiece 63*f* deviates from the determination range R related to the top face 63*aa* of the first workpiece 63*a*. On the other hand, a position of a top face 63*ea* of a first workpiece 63*e* is arranged within the determination range R related to the top face 63*aa* of the first workpiece 63*a*. The determination unit 55 performs determination on the assumption that the top face 63*ea* has substantially the same height as the top face 63*aa*. However, even when an area of the top face 63*aa* and an area of the top face 63*ea* are added, an area where the second workpiece 64*a* faces the first workpieces 63*a* and 63*e* is small. Thus, when the second workpiece 64*a* is arranged on the top face of the first workpieces 63*a* and 63*e*, the workpiece 64*a* becomes unstable. In such a case, the determination unit 55 prohibits the second workpiece 64*a* from being arranged on the upper side of the first workpieces 63*a* and 63*e*.

When an area where a bottom face of the second workpiece and a top face of the first workpiece arranged so as to support the second workpiece face each other is larger than an area acquired by multiplying an area of the bottom face of the second workpiece by a predetermined proportion, the determination unit 55 allows the second workpiece to be arranged on the upper side of the first workpiece. On the other hand, when an area where a top face of the first workpiece and a bottom face of the second workpiece face each other is equal to or smaller than an area acquired by multiplying an area of the bottom face of the second workpiece by a predetermined proportion, the second workpiece is prohibited from being arranged on the upper side of the first workpiece.

Next, control of determining an area where a top face of the first workpiece and a bottom face of the second workpiece face each other and a position where the top face of the first workpiece and the bottom face of the second workpiece face each other will be described in more detail.

Figure 14:
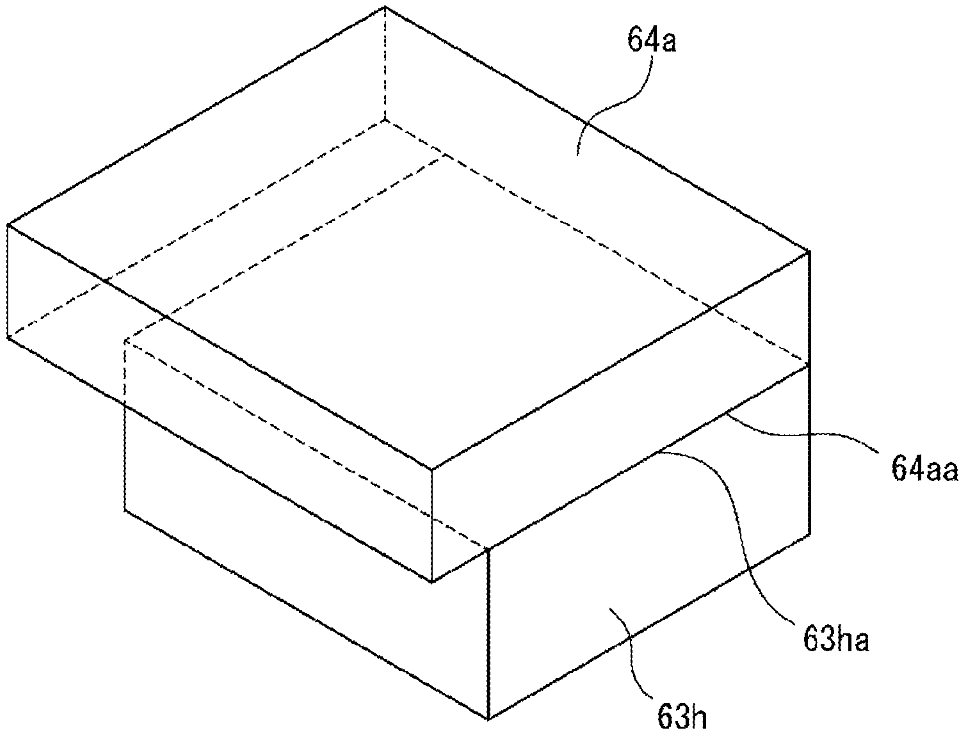
FIG. 14 is a perspective view of the first workpiece and the second workpiece when the second workpiece is arranged on the upper side of the first workpiece.
Figure 15:
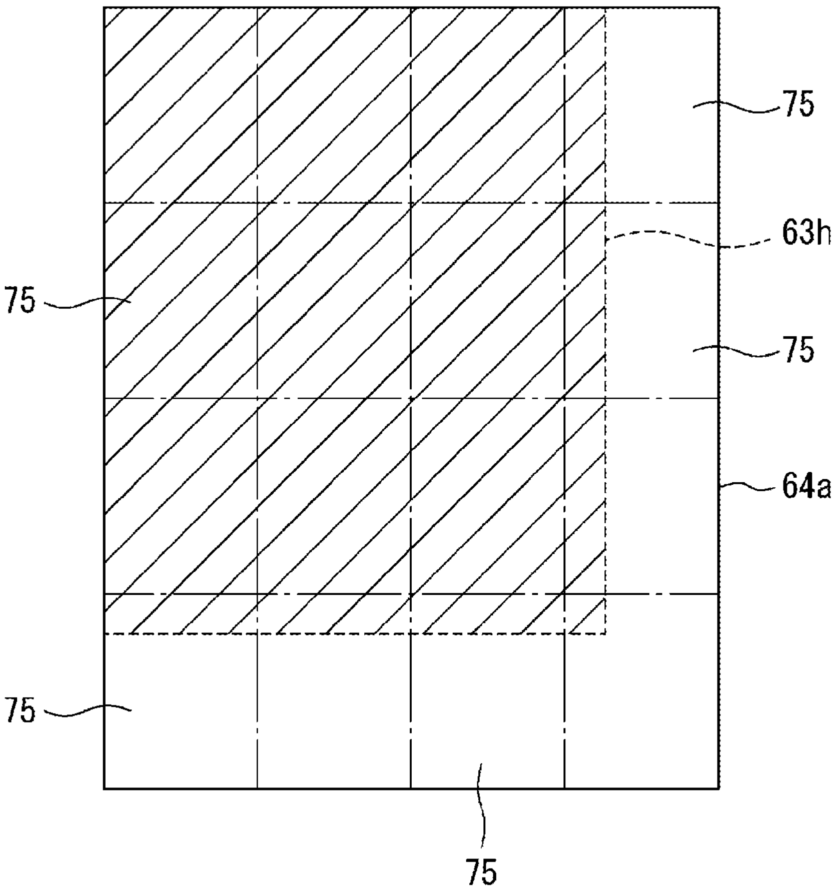
FIG. 15 is a plan view for describing a region where the first workpiece faces when stacking the second workpiece is allowed.

FIG. 14 illustrates a perspective view of an example in which the second workpiece is placed on the upper side of the first workpiece. FIG. 15 illustrates a plan view of the first workpiece and the second workpiece. With reference to FIG. 14 and FIG. 15, the second workpiece 64*a* is arranged on an upper side of a first workpiece 63*h*. An area of a top face 63*ha* of the first workpiece 63*h* is smaller than an area of the bottom face 64*aa* of the second workpiece 64*a*.

The determination unit 55 of the present embodiment sets a plurality of regions 75 by dividing the bottom face 64*aa* of the second workpiece 64*a*. In the example here, the region 75 is formed in a rectangular shape. Additionally, the determination unit 55 divides the bottom face 64*aa* of the second workpiece 64*a* into equal parts. When the number of the region 75 facing the first workpiece 63*h* is equal to or more than a predetermined determination value, the determination unit 55 determines that the top face 63*ha* of the first workpiece 63*h* faces the bottom face 64*aa* of the second workpiece 64*a* in an area having a sufficient size. The determination unit 55 allows the second workpiece 64*a* to be arranged on the upper side of the first workpiece 63*h*.

In the present embodiment, when at least a part of the region 75 faces the top face 63*ha* of the first workpiece 63*h*, it is determined that the region 75 faces the first workpiece 63*h*. In a position of the second workpiece 64*a* illustrated in FIG. 15, 16 regions 75 are set for the bottom face 64*aa* of the workpiece 64*a*. A determination value of the number of the region 75 here is set to 16, which is 100 percent of a total number of the regions 75. In other words, when all of the regions 75 face the first workpiece 63*h*, the second workpiece 64*a* is allowed to be arranged. In the example here, all of the regions 75 face the first workpiece 63*h*. Thus, the determination unit 55 allows the second workpiece 64*a* to be arranged in the position illustrated in FIG. 15.

Figure 16:
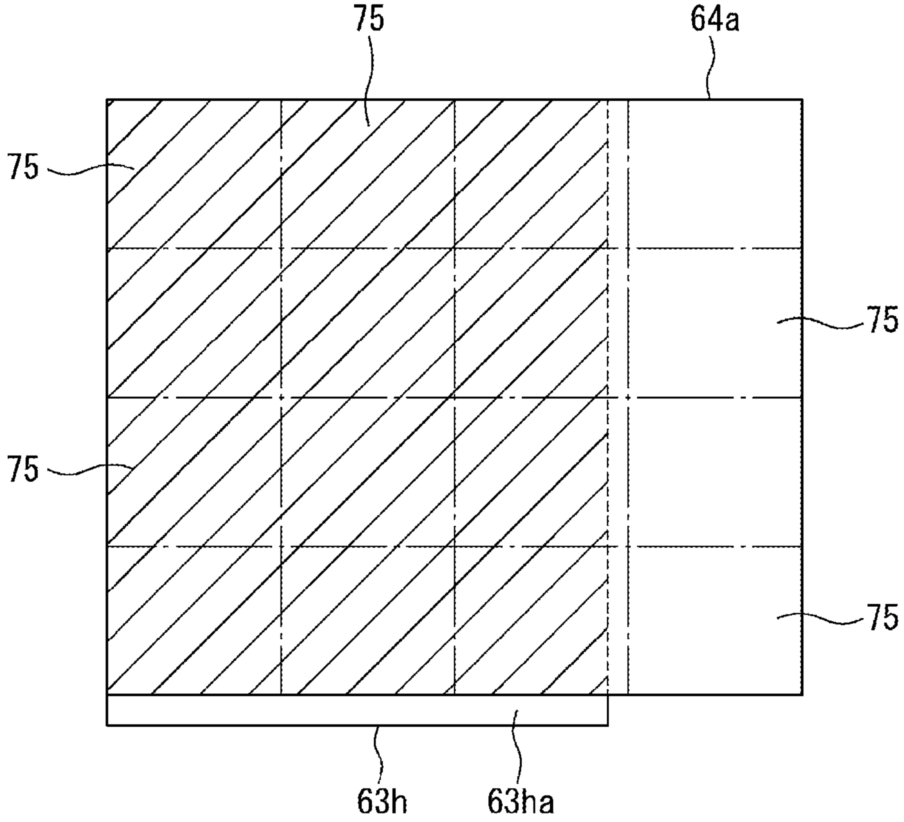
FIG. 16 is a plan view for describing a region where the first workpiece faces when stacking the second workpiece is prohibited.

FIG. 16 illustrates an example in which the second workpiece is prohibited from being arranged on the upper side of the first workpiece. In a position of the second workpiece 64*a* illustrated in FIG. 16, the number of the region 75 facing the top face 63*ha* of the first workpiece 63*h* is 12, which is less than the determination value. Thus, the determination unit 55 determines that an area where the second workpiece 64*a* faces the first workpiece 63*h* is small. The determination unit 55 prohibits the second workpiece 64*a* from being arranged on the upper side of the first workpiece 63*h*.

Note that the determination unit can divide a bottom face of the second workpiece and set a divided region by any method. For example, the determination unit can divide a bottom face into any number of regions. In addition, as a shape of a region, any shape such as a triangle and a hexagon can be employed. In addition, when each of the entire regions 75 faces the first workpiece, the determination unit 55 may determine that the region 75 faces the first workpiece.

Figure 17:
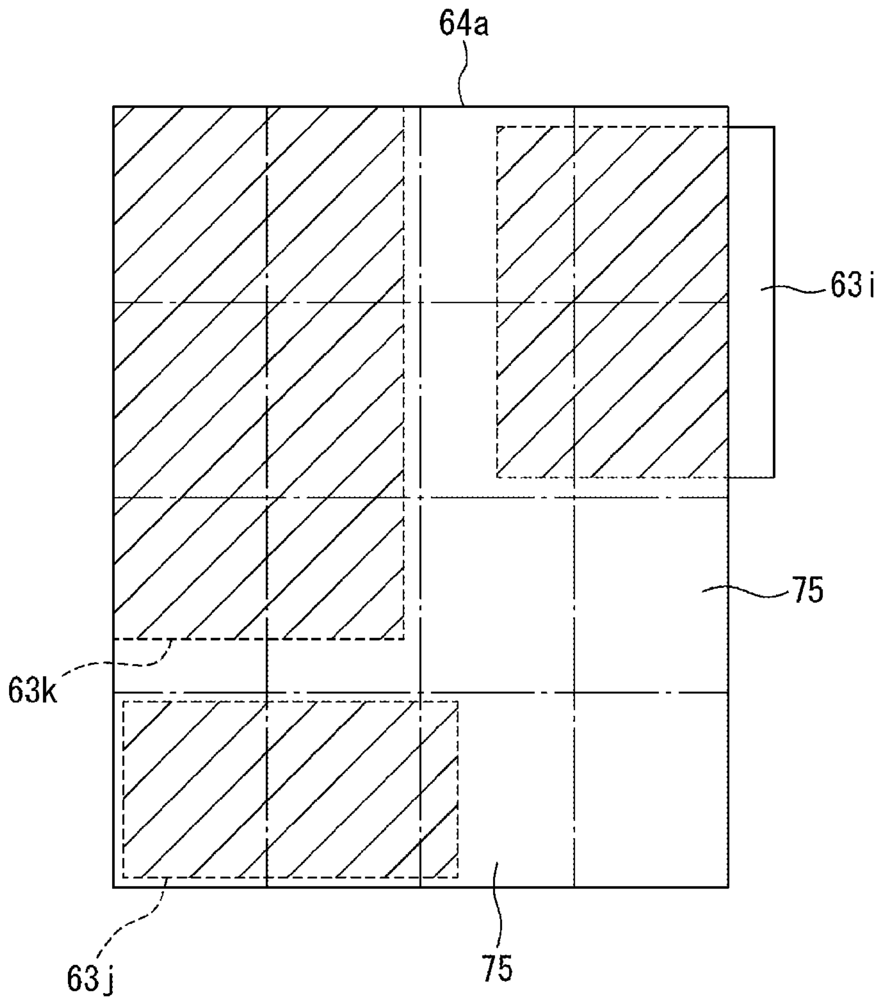
FIG. 17 is a plan view for describing a region where the first workpiece faces when stacking the second workpiece is allowed.

FIG. 17 illustrates an example in which the second workpiece is allowed to be arranged on the upper side of the first workpiece. The determination unit 55 determines whether the second workpiece 64*a* is allowed to be arranged on an upper side of first workpieces 63*i*, 63*j*, and 63*k*. The first workpieces 63*i*, 63*j*, and 63*k* are arranged away from one another. A difference in height among top faces of the first workpieces 63*i*, 63*j*, and 63*k* falls within the determination range R. In the example here, when 80 percent or more of the number (13 or more) of the region 75 among the 16 regions 75 faces the first workpieces 63*i*, 63*j*, and 63*k*, the second workpiece 64*a* is allowed to be arranged. In a position of the second workpiece 64*a* illustrated in FIG. 17, the 13 regions 75 face the first workpieces 63*i*, 63*j*, and 63*k*. Thus, the second workpiece 64*a* is allowed to be arranged on the upper side of the first workpieces 63*i*, 63*j*, and 63*k*.

Next, the determination unit 55 of the present embodiment detects a position of a region of a bottom face of the second workpiece facing a top face of the first workpiece. The determination unit 55 determines whether to allow the second workpiece to be arranged, based on the position of the region.

Figure 18:
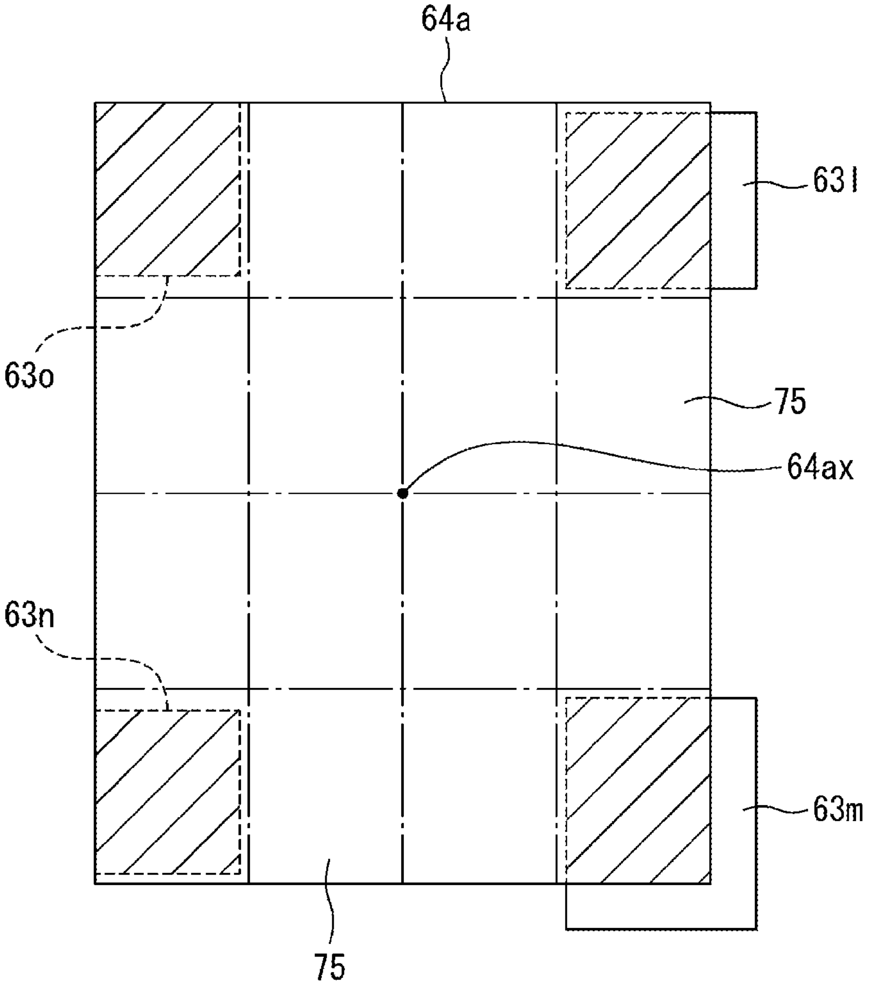
FIG. 18 is a plan view for describing a region where the first workpiece faces when stacking the second workpiece is allowed.

FIG. 18 illustrates an example in which the second workpiece is allowed to be arranged on the upper side of the first workpiece. Even when an area of a bottom face of the second workpiece facing a top face of the first workpiece is small, there is a case where the second workpiece can be arranged in a stable manner. In the example illustrated in FIG. 18, the second workpiece 64*a* is arranged on an upper side of a plurality of first workpieces 63*l*, 63*m*, 63*n*, and 63*o*. A difference in height among top faces of the first workpieces 63*l*, 63*m*, 63*n*, and 63*o* falls within the determination range R.

The first workpieces 63*l*, 63*m*, 63*n*, and 63*o* are arranged so as to support the second workpiece 64*a*, and so as to surround a position of the center of gravity 64*ax* of a shape of the bottom face of the second workpiece 64*a*. In this case, the determination unit 55 allows the second workpiece 64*a* to be arranged on the upper side of the first workpieces 63*l*, 63*m*, 63*n*, and 63*o*. In particular, when three or more regions 75 face the first workpieces 63*l*, 63*m*, 63*n*, and 63*o* so as to surround the center of gravity 64*ax*, the determination unit 55 allows the second workpiece 64*a* to be arranged in this position.

In the example illustrated in FIG. 18, four corner regions 75 among the plurality of regions 75 set for the bottom face of the second workpiece 64*a* face the workpieces 63*l*, 63*m*, 63*n*, and 63*o*. The four corner regions 75 are arranged around the center of gravity 64*ax* so as to surround the center of gravity 64*ax*. The determination unit 55 allows the second workpiece 64*a* to be arranged in this position.

Alternatively, when the region 75 in a predetermined position among the plurality of regions 75 set for the bottom face of the second workpiece faces the first workpiece, the determination unit 55 may allow the second workpiece to be arranged. For example, when a predetermined part of the region 75 among the plurality of regions 75 arranged on an outer circumferential portion of the second workpiece faces the first workpiece, the second workpiece may be allowed to be arranged. In the example illustrated in FIG. 18, the four regions 75 arranged at corners of the bottom face of the second workpiece 64*a* can be specified in advance. When the four regions 75 face the first workpieces 63*l*, 63*m*, 63*n*, and 63*o*, the determination unit 55 can allow the second workpiece 64*a* to be arranged in this position.

Figure 19:
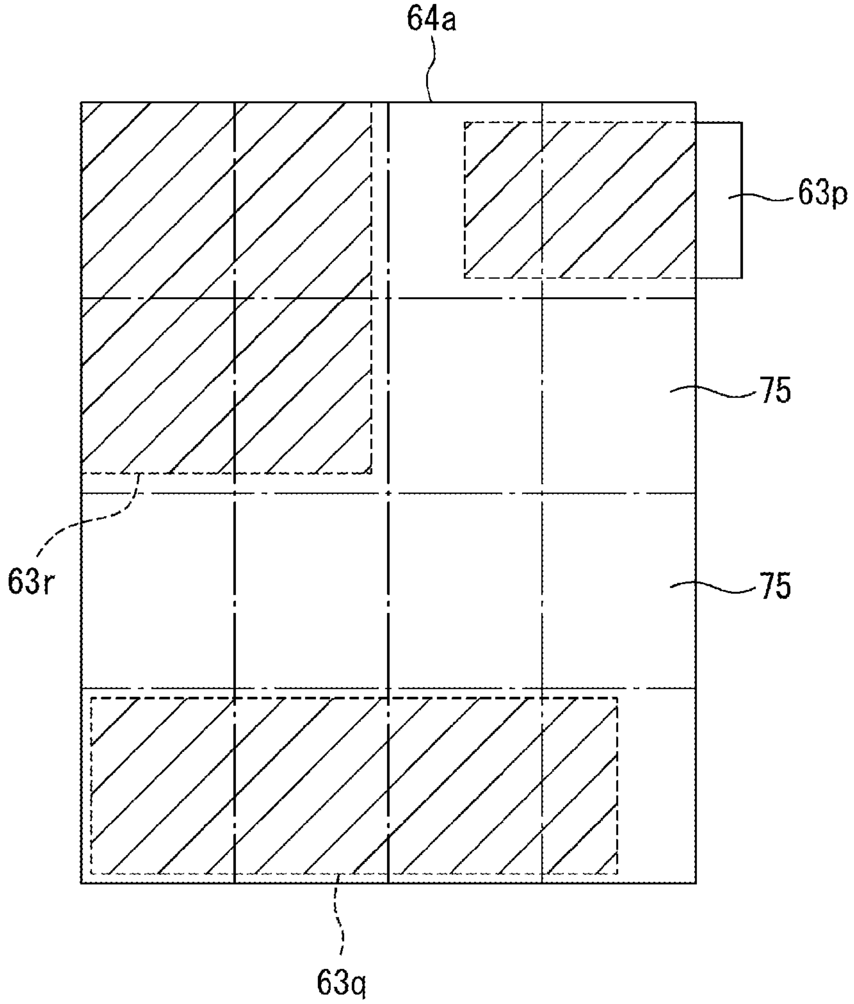
FIG. 19 is a plan view for describing a region where the first workpiece faces when stacking the second workpiece is allowed.

FIG. 19 illustrates an example in which the second workpiece is allowed to be arranged on the upper side of the first workpiece. A difference in height among top faces of first workpieces 63*p*, 63*q*, and 63*r* falls within the determination range R. In this example, 10 is determined as a determination value of the number of the region 75 where the bottom face of the second workpiece 64*a* faces the first workpieces 63*p*, 63*q*, and 63*r*. Furthermore, four regions 75 arranged in corner portions of the bottom face of the second workpiece 64*a* are specified as regions that need to face the first workpieces 63*p*, 63*q*, and 63*r*. In the example illustrated in FIG. 19, since these two conditions are satisfied, the determination unit 55 allows the second workpiece 64*a* to be arranged on an upper side of the first workpieces 63*p*, 63*q*, and 63*r*.

In this way, the determination unit 55 can perform at least one determination of the determination based on an area of a region where the second workpiece faces the first workpiece and the determination based on a position where the second workpiece faces the first workpiece. By performing the control, when the second workpiece is arranged on the upper side of the first workpiece, whether the second workpiece can be arranged in a stable manner can be determined. In particular, these determinations may be combined and performed. Additionally, by setting a region by dividing a bottom face of the second workpiece, the determination based on an area where workpieces face each other can be performed in a simple calculation.

Figure 20:
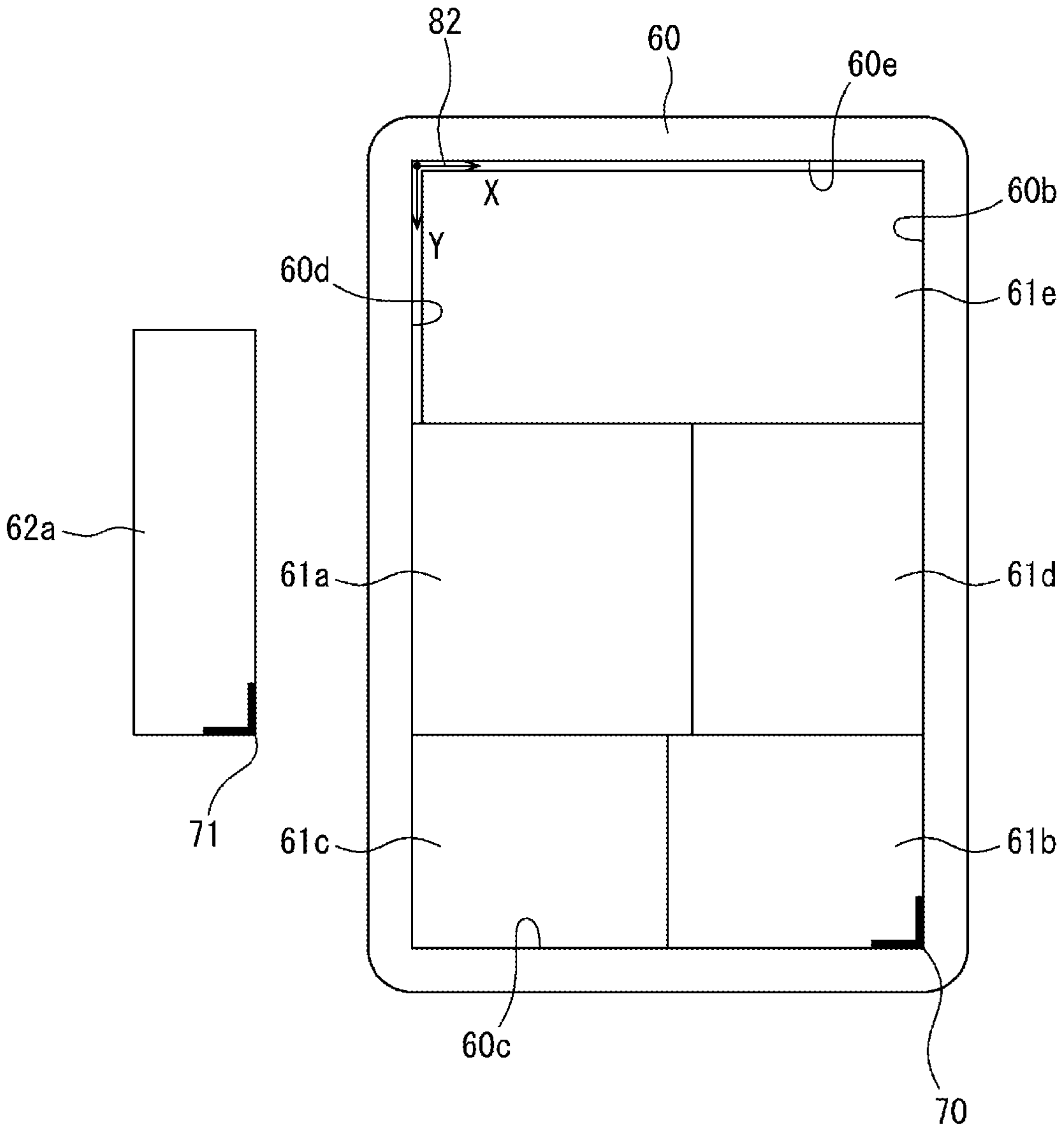
FIG. 20 is a plan view of the workpiece and the container for describing a first step of control of arranging a workpiece of a second stage in the container.

FIG. 20 illustrates a plan view of the workpiece and the container for describing a first step of control of arranging the second workpiece on the upper side of the first workpiece. Next, a specific example of arranging the workpiece of the second stage on the upper side of the workpiece of the first stage illustrated in FIG. 3 is described. When the search unit 54 determines that there is no position where the workpiece is arranged on the base surface 60*a* of the container 60, stacking the second workpiece on the upper side of the first workpieces 61*a* to 61*e* that have already been arranged inside the container 60 is considered. First, a position where a second workpiece 62*a* is arranged on the upper side of the first workpieces 61*a* to 61*e* is set.

In the present embodiment, the search unit 54 determines one position where the second workpiece 62*a* is arranged. The determination unit 55 determines whether the second workpiece 62*a* is allowed to be arranged in one position. The determination unit 55 performs the determination of a difference in height between top faces of the plurality of first workpieces. Additionally, the determination unit 55 performs the determination based on an area of a region where the second workpiece faces the first workpiece and the determination based on a position where the second workpiece faces the first workpiece. Further, the determination unit 55 determines whether the second workpiece 62*a* interferes with the container 60. Furthermore, the determination unit 55 determines whether the second workpiece 62*a* interferes with another second workpiece when the another second workpiece is arranged. A determination result by the determination unit 55 is stored in the input part 42 together with a position of the second workpiece.

Next, the search unit 54 moves the second workpiece 62*a* to a next position by a minute distance in a predetermined direction. Then, the determination unit 55 determines whether the second workpiece 62*a* is allowed to be arranged in the next position. The search unit 54 repeats the movement of the second workpiece 62*a* and the determination inside the region surrounded by the wall faces 60*b* to 60*e* of the container 60. When the workpiece 62*a* can be arranged in a plurality of positions, the selection unit 56 selects a position where the second workpiece 62*a* is arranged according to a predetermined condition.

More specifically, the acquisition unit 53 acquires, from the input part 42, information on a shape and information on a position of the workpieces 61*a* to 61*e* arranged inside the container 60. The search unit 54 detects a workpiece having a top face being exposed, based on the information on the workpieces 61*a* to 61*e*. In other words, when workpieces are stacked in a plurality of stages, a workpiece arranged on a highest side is detected. In the example here, the workpieces 61*a* to 61*e* of the first stage correspond to a workpiece having a top face being exposed. The search unit 54 sets the workpieces 61*a* to 61*e* as the first workpiece. In a bottom face of the second workpiece 62*a*, the base point 71 is set at the corner. Further, the base point 70 of the container 60 has moved from the base surface 60*a* to the top face of the first workpiece 61*b*.

Figure 21:
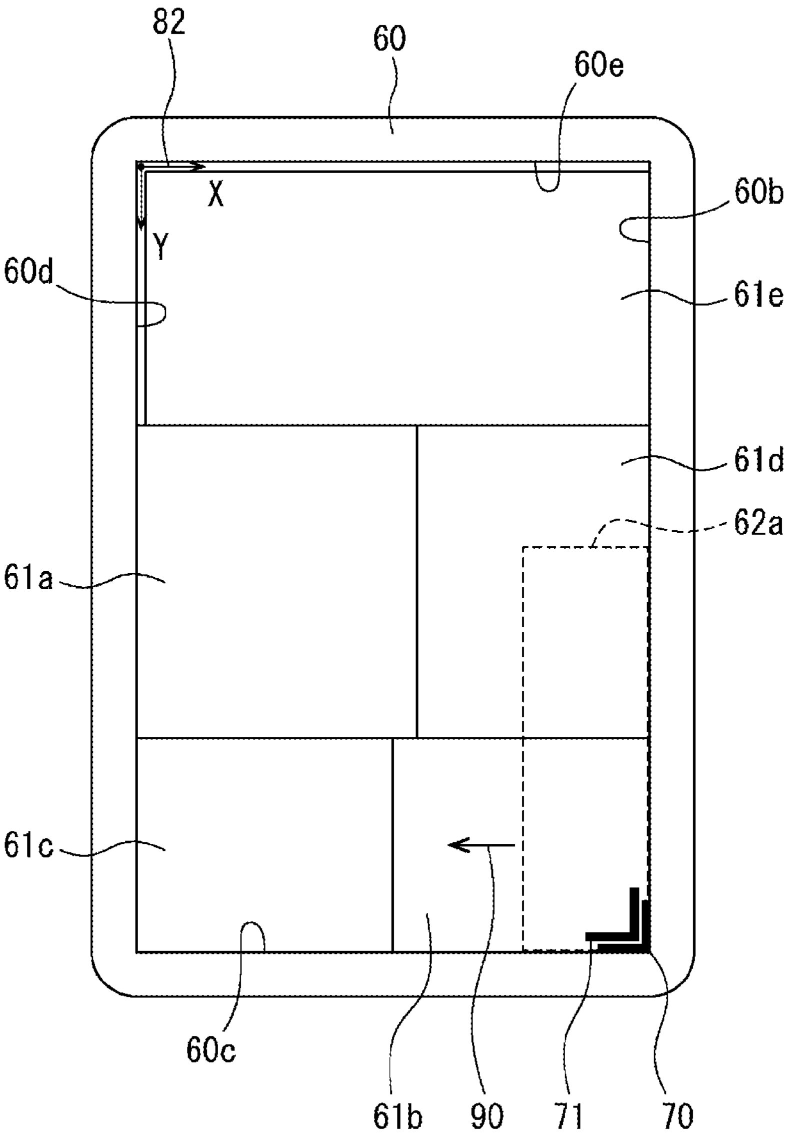
FIG. 21 is a plan view of the workpiece and the container for describing a second step of the control of arranging the workpiece of the second stage in the container.

FIG. 21 illustrates a plan view of the workpiece and the container for describing a second step of the control of arranging the second workpiece on the upper side of the first workpiece. The search unit 54 arranges the second workpiece 62*a* such that the base point 71 overlaps the base point 70. The determination unit 55 determines whether the second workpiece 62*a* is allowed to be arranged on the upper side of the first workpieces 61*b* and 61*d*. In the example here, a difference in height between the top face of the first workpiece 61*b* and the top face of the first workpiece 61*d* deviates from the determination range R. Further, an area where the bottom face of the second workpiece 62*a* and the top face of the first workpiece 61*d* that supports the second workpiece 62*a* face each other is smaller than a predetermined area. Thus, the determination unit 55 prohibits the second workpiece 62*a* from being arranged in this position. The input part 42 stores the position of the second workpiece 62*a* and the determination result.

Next, the search unit 54 moves the workpiece 62*a* in a predetermined direction. The search unit 54 of the present embodiment moves the workpiece 62*a* similarly to the control of searching for a position of the workpiece of the first stage. In the present embodiment, the workpiece 62*a* is moved in the X-axis direction of the workpiece coordinate system 82, and then moved in the Y-axis direction. As indicated by the arrow 90, the search unit 54 moves the workpiece 62*a* by a predetermined minute distance in the X-axis direction of the workpiece coordinate system 82. The determination unit 55 determines whether the arrangement of the workpiece 62*a* in the position is allowed. The search unit 54 repeats the movement in the X-axis direction and the determination of the arrangement of the workpiece 62*a* until the workpiece 62*a* interferes with the wall face 60*d* of the container 60. The input part 42 stores each position of the second workpiece 62*a* together with the determination result.

Figure 22:
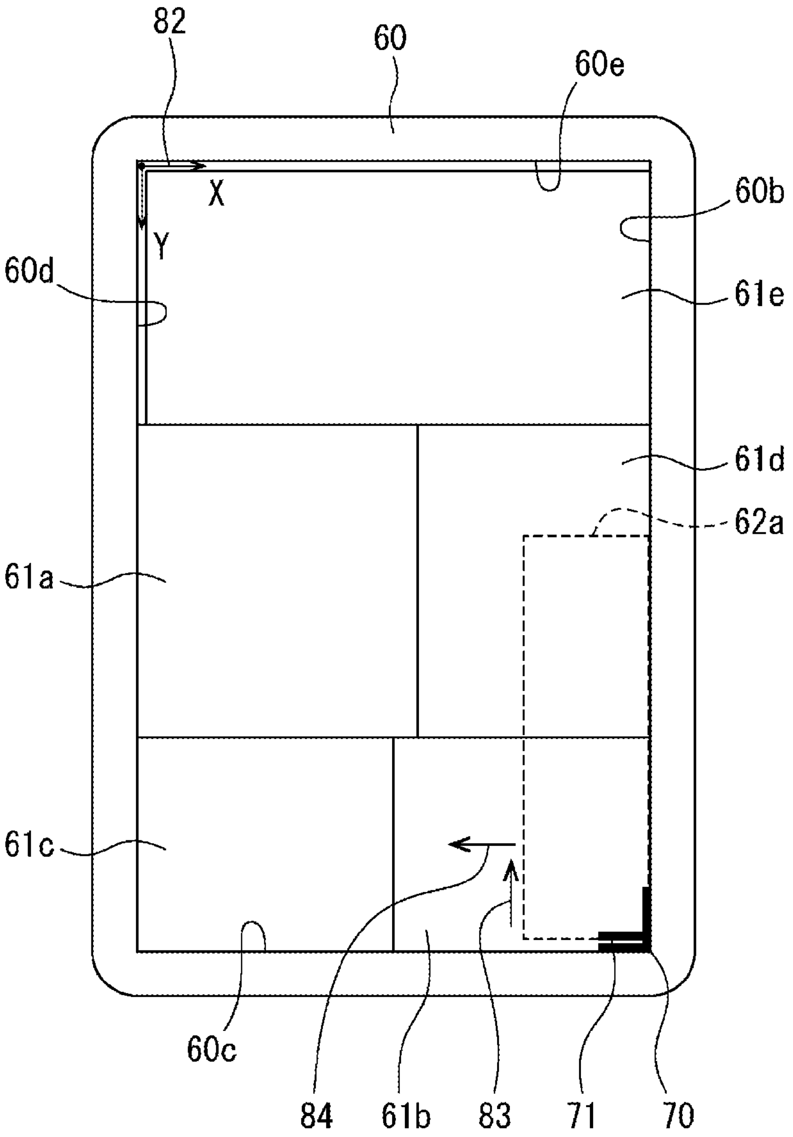
FIG. 22 is a plan view of the workpiece and the container for describing a third step of the control of arranging the workpiece of the second stage in the container.

FIG. 22 illustrates a plan view of the workpiece and the container for describing a third step of the control of arranging the second workpiece on the upper side of the first workpiece. Next, as indicated by the arrow 83, the search unit 54 moves the second workpiece 62*a* in the Y-axis direction from the position where the base point 71 overlaps the base point 70. The search unit 54 moves the second workpiece 62*a* by a minute distance. The determination unit 55 determines whether the arrangement of the workpiece 62*a* in the position is allowed. Next, as indicated by the arrow 84, the search unit 54 determines whether the arrangement of the workpiece 62*a* is allowed while moving the second workpiece 62*a* by a minute distance in the X-axis direction. The search unit 54 repeats the movement in the X-axis direction and the determination of the arrangement until the second workpiece 62*a* interferes with the wall face 60*d*. The input part 42 stores each position of the second workpiece 62*a* together with the determination result.

The movement of the second workpiece 62*a* in the Y-axis direction is performed until the second workpiece 62*a* interferes with the wall face 60*e* of the container 60. In this way, the movement in the X-axis direction and the movement in the Y-axis direction are repeated, and the determination control of determining whether the second workpiece 62*a* is allowed to be arranged is also performed. In the example here, in a direction of the second workpiece 62*a* in which a long side of a planar shape of the second workpiece 62*a* is parallel to the wall face 60*b*, the second workpiece 62*a* is prohibited from being arranged on the upper side of the first workpieces 61*a* to 61*e*.

Figure 23:
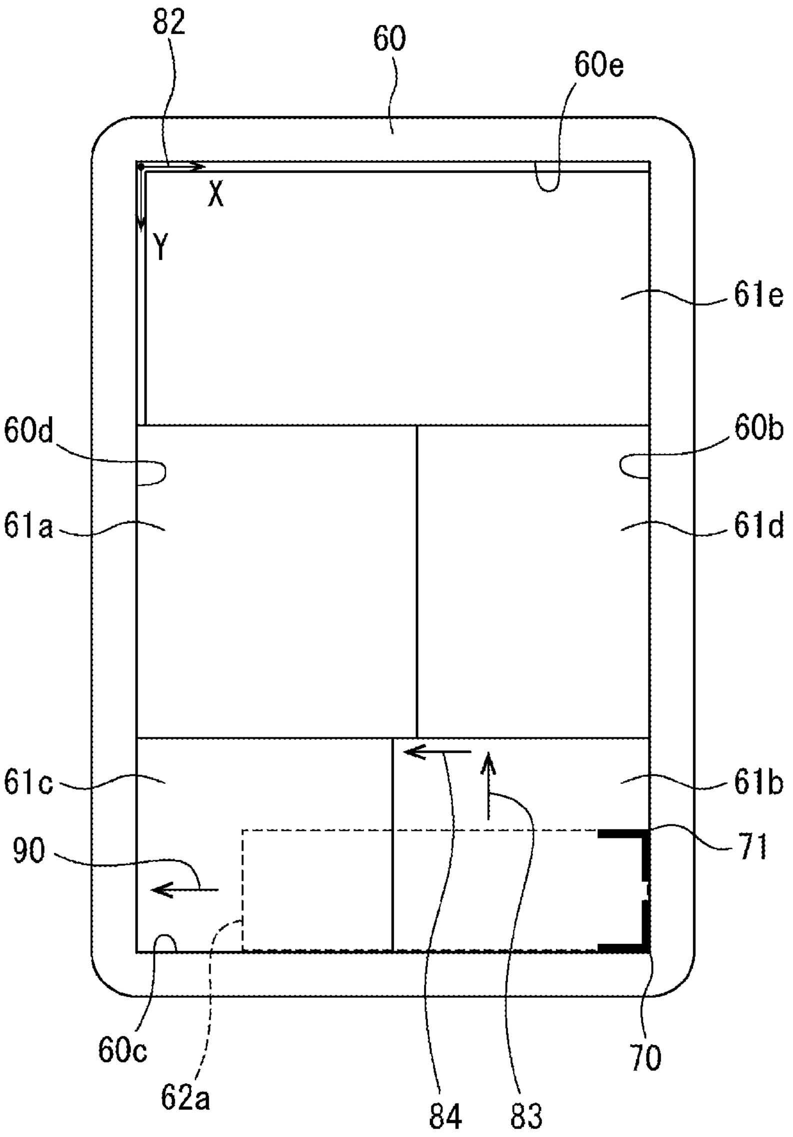
FIG. 23 is a plan view of the workpiece and the container for describing a fourth step of the control of arranging the workpiece of the second stage in the container.

FIG. 23 illustrates a plan view of the workpiece and the container for describing a fourth step of the control of arranging the second workpiece on the upper side of the first workpiece. Next, the search unit 54 rotates the second workpiece 62*a* by a predetermined rotation angle so as to change a direction of the second workpiece 62*a*. In the present embodiment, a position of the second workpiece 62*a* is rotated 90° about a rotation axis extending perpendicularly to the base surface 60*a* of the container 60. Then, the search unit 54 arranges the second workpiece 62*a* such that the corner of the second workpiece 62*a* overlaps the base point 70.

In the example here, a difference in height between the top face of the first workpiece 61*b* and the top face of the first workpiece 61*c* falls within the determination range R. The determination unit 55 allows the second workpiece 62*a* to be arranged so as to be supported by the first workpiece 61*b* and the first workpiece 61*c*. Furthermore, an area where the bottom face of the second workpiece 62*a* and the first workpieces 61*b* and 61*d* face each other is larger than the predetermined area. Thus, the determination unit 55 allows the workpiece 62*a* to be arranged in this position. The input part 42 stores the position of the workpiece 62*a* and the determination result.

Next, the search unit 54 repeats the movement in the X-axis direction of the workpiece coordinate system 82 as indicated by the arrow 90, and also performs the determination control of determining whether the second workpiece 62*a* is allowed to be arranged. Additionally, the search unit 54 repeats the movement in the Y-axis direction and in the X-axis direction as indicated by the arrows 83 and 84, and also performs the determination control of determining whether the second workpiece 62*a* is allowed to be arranged. The input part 42 stores all the positions of the workpiece 62*a* and the determination result.

When the control of searching for a position where the second workpiece is arranged on the upper side of the first workpiece of the present embodiment is performed, the search unit 54 may detect a plurality of positions where the second workpiece can be arranged. With reference to FIG. 2, the search unit 54 of the present embodiment includes the selection unit 56 that selects a position where the second workpiece is arranged. The selection unit 56 sets a position where the second workpiece is arranged according to a plurality of conditions having a predetermined priority level. The selection unit 56 selects a position where the second workpiece is arranged according to a first condition having a first priority level. When there are a plurality of positions that satisfy the first condition and where the second workpiece is arranged, the selection unit 56 selects a position where the second workpiece is arranged according to a second condition having a second priority level. In the example here, it is determined as the first condition that a height of the first workpiece that supports the second workpiece is lowest. It is determined as the second condition that a base point of the second workpiece is closest to the base point of the container.

The selection unit 56 acquires, from the input part 42, a plurality of positions where the arrangement of the second workpiece is allowed. According to the first condition, the selection unit 56 selects a position of the second workpiece facing the first workpiece having the lowest height of the top face from among the plurality of positions where the arrangement of the second workpiece is allowed. The selection unit 56 sets an order of positions in the height direction of the top face of the first workpieces 61*a* to 61*e*. The search unit 54 sets the order in ascending order of height of the top face. With reference to FIG. 3, in the example here, the order of the workpiece 61*a*, the workpiece 61*c*, the workpiece 61*b*, the workpiece 61*d*, and the workpiece 61*e* is set.

With reference to FIG. 23, the second workpiece 62*a* can be arranged in a position facing the workpieces 61*b* and 61*c* and in a position facing the workpiece 61*e* in a direction in which a short side of the planar shape of the second workpiece 62*a* is parallel to the wall face 60*b*. The selection unit 56 selects the workpiece 61*b* having the lowest position of the top face among the workpieces 61*b*, 61*c*, and 61*e*. Then, the selection unit 56 selects the position facing the workpieces 61*b* and 61*c*. In the example here, there are a plurality of positions where the second workpiece 62*a* is allowed to be arranged so as to face the first workpieces 61*b* and 61*c*.

Next, according to the second condition, the selection unit 56 selects a position where the base point 71 of the second workpiece 62*a* is closest to the base point 70 of the container 60. In the example here, in a position (position of the second workpiece 62*a* illustrated in FIG. 23) where the corner of the second workpiece 62*a* overlaps the base point 70, a distance of the base point 71 from the base point 70 is smallest. The selection unit 56 can set this position as a position where the second workpiece 62*a* is arranged. In this way, by predetermining a condition having a priority level, a position where the second workpiece is arranged can be selected.

Three or more conditions for selecting a position where the second workpiece is arranged may be determined. For example, a priority order of a direction of a workpiece can be predetermined as a condition for selecting a position where the second workpiece is arranged other than the conditions described above. A state where the short side of the planar shape of the workpiece 62*a* is parallel to the wall face 60*b* of the container 60 as illustrated in FIG. 23 can be prioritized more than a state where the long side of the planar shape of the workpiece 62*a* is parallel to the wall face 60*b* of the container 60 as illustrated in FIG. 21. In this way, by predetermining a condition having a priority level, the selection unit 56 can select a position where the second workpiece is arranged. By adopting this control, a workpiece can be stacked so as to be close to a desired state of an operator.

Figure 24:
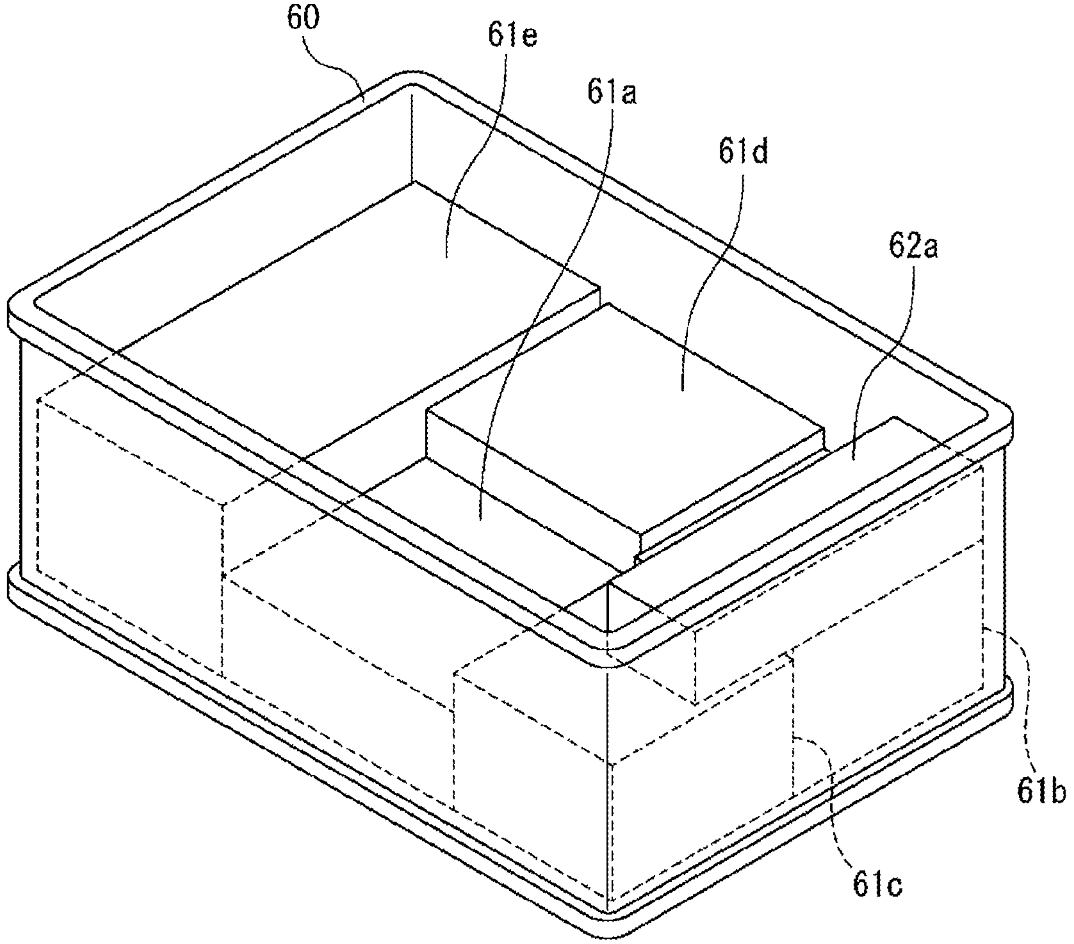
FIG. 24 is a perspective view of the container and the workpiece when the second workpiece is arranged on the upper side of the first workpiece.

FIG. 24 illustrates a perspective view of the container and the workpiece when one second workpiece is arranged on the upper side of the first workpiece. The robot apparatus 3 arranges the workpiece 62*a* in a position determined by the search unit 54. The operation control unit 43 arranges the second workpiece 62*a* on the upper side of the first workpiece 61*b* and the first workpiece 61*c* by driving the robot 1 and the hand 5.

Figure 25:
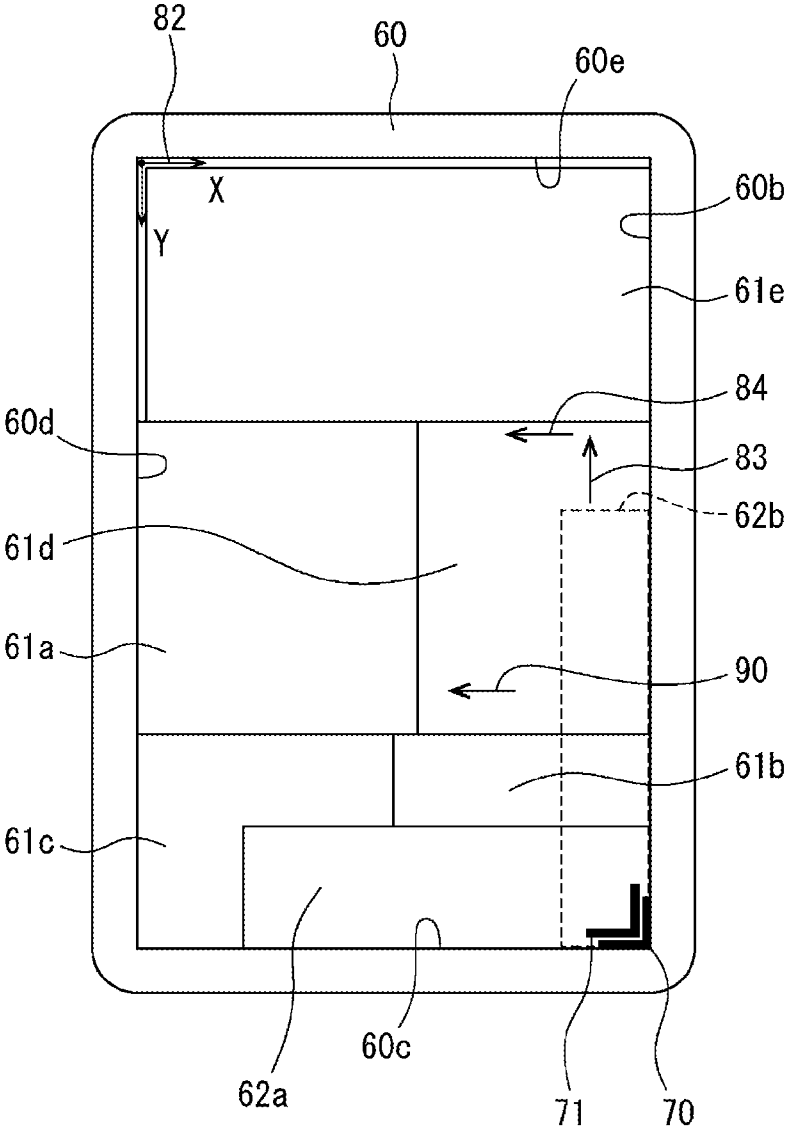
FIG. 25 is a plan view of the workpiece and the container for describing a fifth step of the control of arranging the workpiece of the second stage in the container.

FIG. 25 illustrates a plan view of the workpiece and the container for describing a fifth step of the control of arranging the second workpiece on the upper side of the first workpiece. Next, the search unit 54 searches for a position where a second workpiece 62*b* is arranged. The search unit 54 performs control of setting a position where the second workpiece 62*b* is arranged by control similar to that of the second workpiece 62*a*.

The search unit 54 arranges the second workpiece 62*b* such that the base point 71 of the second workpiece 62*b* overlaps the base point 70 of the container. Since the second workpiece 62*b* interferes with the second workpiece 62*a*, the determination unit 55 prohibits the second workpiece 62*b* from being arranged in this position. Next, the search unit 54 moves the second workpiece 62*b* by a minute distance in the X-axis direction of the workpiece coordinate system 82 as indicated by the arrow 90. The determination unit 55 determines whether the arrangement of the second workpiece 62*b* is allowed. The movement in the X-axis direction and the determination are repeated until the workpiece 62*b* interferes with the wall face 60*d* of the container 60. Next, the search unit 54 performs the determination while repeating the movement in the Y-axis direction and the movement in the X-axis direction as indicated by the arrows 83 and 84. The movement in the Y-axis direction is performed until the workpiece 62*b* interferes with the wall face 60*e* of the container 60. The input part 42 stores all the positions of the workpiece 62*b* and the determination result.

Figure 26:
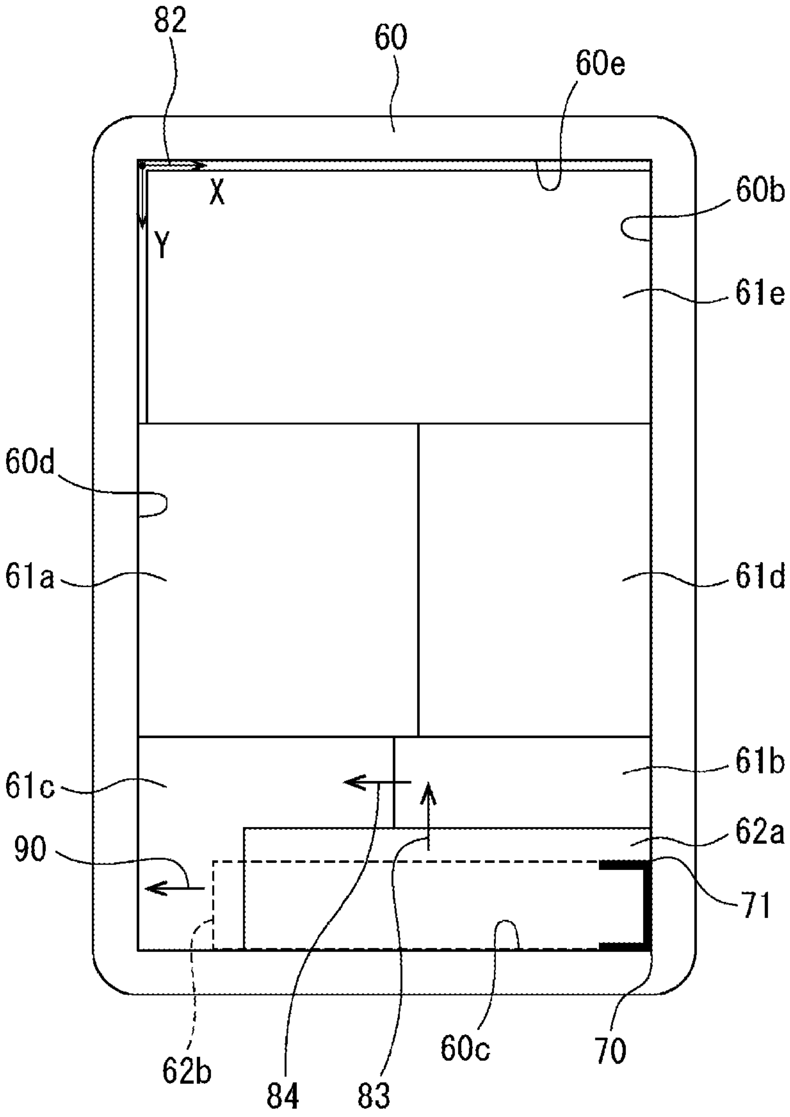
FIG. 26 is a plan view of the workpiece and the container for describing a sixth step of the control of arranging the workpiece of the second stage in the container.

FIG. 26 illustrates a plan view of the workpiece and the container for describing a sixth step of the control of arranging the second workpiece on the upper side of the first workpiece. Next, the search unit 54 performs control of determining whether the arrangement of the workpiece 62*b* is allowed in a state where the second workpiece 62*b* is rotated 90°. The search unit 54 arranges the workpiece 62*b* such that the corner of the workpiece 62*b* overlaps the base point 70. The search unit 54 gradually moves the workpiece 62*b* in the X-axis direction of the workpiece coordinate system 82 as indicated by the arrow 90, and determines whether the arrangement of the workpiece 62*b* is allowed. Furthermore, the search unit 54 determines whether the arrangement of the workpiece 62*b* is allowed while performing the movement in the X-axis direction and the movement in the Y-axis direction as indicated by the arrows 83 and 84. The input part 42 stores all the positions of the workpiece 62*b* and the determination result.

Figure 27:
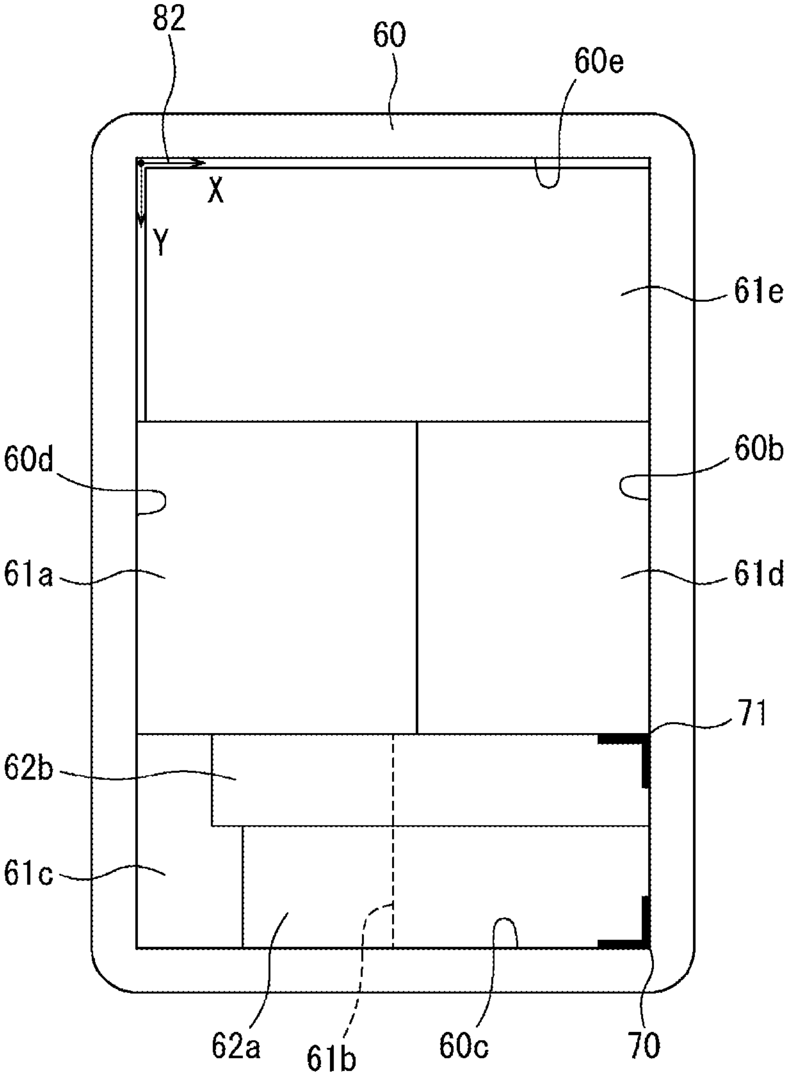
FIG. 27 is a plan view of the workpiece and the container for describing a seventh step of the control of arranging the workpiece of the second stage in the container.

FIG. 27 illustrates a plan view of the workpiece and the container for describing a seventh step of the control of arranging the second workpiece on the upper side of the first workpiece. The selection unit 56 acquires, from the input part 42, a plurality of positions where the arrangement of the second workpiece 62*b* is allowed. The selection unit 56 selects a position where the second workpiece 62*b* is arranged according to a predetermined condition. In the example here, the second workpiece 62*b* can be arranged on the top face of the first workpieces 61*b* and 61*c* or the top face of the first workpiece 61*e* in a state where a short side of the second workpiece 62*b* is parallel to the wall face 60*b*. In the example here, according to the predetermined condition, the second workpiece 62*b* is arranged on the top face of the first workpieces 61*b* and 61*c* in a region between the second workpiece 62*a* and the first workpiece 61*d*.

The arrangement of third and subsequent second workpieces can be performed by control similar to the control of arranging the second workpieces 62*a* and 62*b*. Additionally, the arrangement of the second workpiece is performed until the workpiece of the second stage cannot be arranged inside the container 60. Furthermore, after the arrangement of the workpiece of the second stage is completed, a workpiece of a third stage can be arranged. When the workpiece of the third stage is arranged, control similar to the control of arranging the workpiece of the second stage can be performed. In this case, the workpiece arranged in the second stage is the first workpiece, and the workpiece arranged in the third stage is the second workpiece. When a workpiece of fourth and subsequent stages is arranged, control similar to the control of arranging the workpiece of the third stage can also be performed.

In the present embodiment, the search unit 54 moves the second workpiece 62*a* to all positions without interfering with the container 60, but the present invention is not limited to this embodiment. A range in which the second workpiece moves can be predetermined. Alternatively, when one position where the arrangement of the second workpiece is allowed is detected, the position may be determined as a position where the second workpiece is arranged.

Timing at which stacking of a workpiece of the present embodiment is terminated can be determined by any control. For example, the control of stacking a workpiece may be terminated when a position of the highest top face among top faces of a plurality of workpieces exceeds a predetermined determination value. Additionally, a lid may be arranged on an opening of a container. In this case, when it is determined that a top face of a workpiece exceeds a height of a wall face of the container, the control of stacking the workpiece may be terminated. Alternatively, when a workpiece is stacked on a pallet, an arrangement region where the workpiece is arranged on an upper side of the pallet can be preset. When it is determined that a top face of the workpiece exceeds the arrangement region, the control of stacking the workpiece may be terminated. Alternatively, when a command for terminating the control of stacking the workpiece is input by an operation of a teach pendant by an operator and the like, the arrangement of the workpiece may be terminated.

Note that the robot apparatus may perform stacking of a workpiece even in a region higher than an upper end of a wall face of a container. In the present embodiment, information on a three-dimensional shape of a container is stored in advance in the input part. Thus, a workpiece may be arranged in a region higher than an upper end of a wall face of the container such that the workpiece protrudes toward a side from the wall face.

Additionally, when the search unit 54 searches for a position where the second workpiece is arranged, there may be no position where the second workpiece is arranged on the upper side of the first workpiece. In other words, the determination unit 55 may prohibit the second workpiece from being arranged in all positions with respect to the first workpiece. In this case, the search unit 54 transmits, to the teach pendant 49, information indicating that there is no position where the second workpiece is arranged. The display part 49*b* in the teach pendant 49 displays the information. An operator can recognize that stacking of the workpiece is completed. Then, the controller 2 terminates the control of stacking the workpiece in a current container.

The position setting device according to the present embodiment can automatically set a position of a workpiece arranged in a container. Thus, the robot apparatus including the position setting device according to the present embodiment can perform an operation of automatically stacking a workpiece. In particular, even when the number of a workpiece, a size of the workpiece, and an order in which the workpiece is stacked are not determined, the workpiece can be automatically stacked on a support member such as a container.

The sensor in the present embodiment is a three-dimensional sensor that can detect a three-dimensional shape of a workpiece. Since a three-dimensional shape of a workpiece can be detected by the sensor, an operation of storing information related to a shape of the workpiece in advance in the input part can be eliminated.

For example, a two-dimensional camera can be employed as the sensor. Then, a reference image related to an image of the two-dimensional camera can be stored in the input part. Further, the input part can store information on dimensions and the like of a workpiece corresponding to the reference image. By selecting the reference image that matches an actually captured image the most, a three-dimensional shape of the workpiece can be detected. However, in such control, the reference image of the workpiece and the information on the dimensions and the like of the workpiece need to be created in advance. By employing the three-dimensional sensor as the vision sensor, such an operation can be eliminated.

Figure 28:
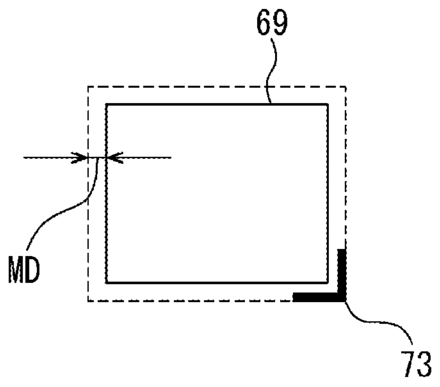
FIG. 28 is a plan view of a workpiece when a margin width is added to dimensions of the workpiece.

FIG. 28 illustrates a plan view of a workpiece for describing a margin width of the workpiece. When the search unit 54 searches for a position where a workpiece is arranged, the search unit 54 can add a predetermined margin width MD to dimensions of a workpiece 69, and search for a position where the workpiece 69 is arranged. In other words, a position where the workpiece is arranged can be searched by using a shape acquired by adding the margin width MD to an outer edge of a shape of the workpiece 69. In this case, a base point 73 of the workpiece 69 can be set at a corner of the shape acquired by adding the margin width MD.

When a workpiece is conveyed by the robot 1, the workpiece may be slightly shaken. Due to a shake of the workpiece, the workpiece may interfere with other workpieces or a container. The interference of the workpiece can be suppressed by adding a margin width to a size of the workpiece. A size of the margin width MD depends on a size and a weight of the workpiece and the container, performance of a robot, or the like. For example, a value of equal to or more than 0.5 mm and equal to or less than 1 mm can be set for the size of the margin width MD.

Figure 29:
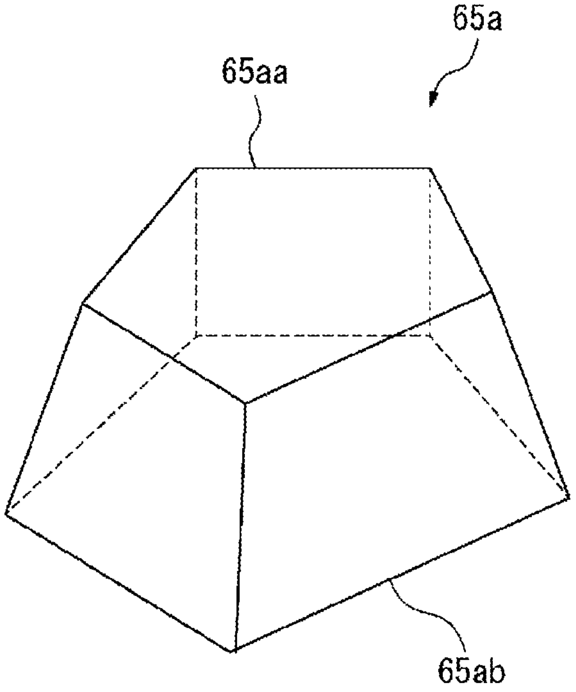
FIG. 29 is a perspective view of another workpiece in the embodiment.

FIG. 29 illustrates a perspective view of another workpiece of the present embodiment. The above-described workpiece has a rectangular parallelepiped shape, but the present invention is not limited to this embodiment. The control according to the present embodiment can be applied to any workpiece including a top face and a bottom face. Any shape can be employed as a top face and a bottom face. Another workpiece 65*a* includes a top face 65*aa* and a bottom face 65*ab* that are parallel to each other. The top face 65*aa* and the bottom face 65*ab* are a plane surface. A shape of the top face 65*aa* and the bottom face 65*ab* is a pentagon. Furthermore, an area of the top face 65*aa* and an area of the bottom face 65*ab* are different from each other. Control similar to the control of the present embodiment can also be performed on such a workpiece.

Additionally, in the present embodiment, the robot conveys a workpiece to a position set by the position setting device, but the present invention is not limited to this embodiment. A device other than the robot may convey a workpiece after the position setting device sets a position where the workpiece is arranged. Alternatively, the display part of the teach pendant may display a position where a workpiece is arranged, and an operator may arrange the workpiece in the displayed position.

In each control described above, the order of the steps can be changed as appropriate as long as the function and the effect are not changed.

The above embodiment can be combined as appropriate. In each of the above-described drawings, the same or equivalent parts are denoted by the same reference numerals. It should be noted that the above-described embodiment is an example and does not limit the invention. In addition, the embodiment includes modifications of the embodiment described in the claims.

REFERENCE SIGNS LIST

1 Robot
2 Controller
3 Robot apparatus
5 Hand
30 Vision sensor
42 Input part
49 Teach pendant
49*b* Display part
52 Shape detection unit
53 Acquisition unit
54 Search unit
55 Determination unit
56 Selection unit
60 Container
61*a*, 61*b*, 61*c*, 61*d*, 61*e* First workpiece
63*a* to 63*r* First workpiece
63*aa*, 63*ba*, 63*ca*, 63*da*, 63*ea*, 63*fa*, 63*ga*, 63*ha* Top face
62*a*, 62*b*, 62*c* Second workpiece
64*a* Second workpiece
64*aa* Bottom face
65*a* Workpiece
65*aa* Top face
65*ab* Bottom face
69 Workpiece
71, 72, 73 Base point
75 Region

The invention claimed is:

1. A robot apparatus, comprising:

a position setting device configured to set a position where a second workpiece is stacked on an upper side of a plurality of first workpieces;

an operation tool configured to grip the second workpiece;

a robot configured to move the operation tool; and a controller configured to control the operation tool and the robot, wherein the controller detects a position and an orientation of the second workpiece based on an output from a sensor, drives the robot so as to grip the second workpiece based on the position and the orientation of the second workpiece, and drives the robot so as to convey the second workpiece to a position, set by the position setting device, where the second workpiece is arranged, the position setting device comprises a sensor configured to detect a shape of the second workpiece, a processor configured to detect a shape of the second workpiece based on an output from the sensor, acquire shapes and positions of the plurality of first workpieces, and search for a position where the second workpiece is allowed to be arranged on the upper side of the plurality of first workpieces, each workpiece of the first workpiece and the second workpiece includes a top face and a bottom face, a determination range of a difference in height between a top face of one first workpiece and a top face of another first workpiece is predetermined, the processor is configured to determine whether the second workpiece is allowed to be arranged so as to be supported by both workpieces of the one first workpiece and the other first workpiece when a height of the top face of the one first workpiece and a height of the top face of the other first workpiece are different, the processor allows the second workpiece to be arranged so as to be supported by both workpieces of the one first workpiece and the other first workpiece when a difference in the height falls within the determination range, and prohibits the second workpiece from being arranged so as to be supported by both workpieces of the one first workpiece and the other first workpiece when a difference in the height deviates from the determination range, the processor sets a plurality of divided regions by dividing the entire bottom face of the second workpiece into equal parts, the processor calculates the number of a divided region facing the first workpiece;

when the number of the divided region facing the first workpiece is equal to or more than a predetermined determination value without evaluating total area of the divided regions facing the first workpiece, the processor allows the second workpiece to be arranged on the upper side of the first workpiece;

the predetermined determination value is smaller than a number of the divided regions of the entire bottom face of the second workpiece; and the processor is further configured to determine that the divided region of the bottom face of the second workpiece faces the first workpiece when at least a part of the divided region of the bottom face of the second workpiece faces the top face of the first workpiece, and calculates the number of the divided region facing the first workpiece.

2. The robot apparatus of claim 1, wherein the processor is configured to select a position where the second workpiece is arranged when the second workpiece is allowed to be arranged in a plurality of positions on the upper side of the first workpiece, the processor selects a position where the second workpiece is arranged according to a first condition having a first priority level, and, when there are a plurality of positions that satisfy the first condition and where the second workpiece is arranged, the processor selects a position where the second workpiece is arranged according to a second condition having a second priority level.

3. The robot apparatus of claim 1, wherein the sensor is a three-dimensional sensor configured to be able to detect a three-dimensional shape of the first workpiece.

4. The robot apparatus of claim 1, further comprising a display part configured to display information related to an arrangement of the second workpiece, wherein, when the processor cannot detect a position where the arrangement of the second workpiece is allowed on the upper side of the first workpiece, the display part indicates that there is no position where the second workpiece is arranged.

5. The robot apparatus of claim 1, wherein the processor adds a predetermined margin width to dimensions of the second workpiece, and determines whether the arrangement of the second workpiece is allowed.

* * * * *